(12) United States Patent
Yamashita et al.

(10) Patent No.: US 8,402,992 B2
(45) Date of Patent: Mar. 26, 2013

(54) BRANCHING UNIT FOR BORING WITHOUT STOPPING PASSAGE OF FLUID

(75) Inventors: Tamotsu Yamashita, Shiga (JP); Taihei Yokoyama, Shiga (JP)

(73) Assignee: Suiken Co., Ltd., Shiga (JP)

( * ) Notice: Subject to any disclaimer, the term of this patent is extended or adjusted under 35 U.S.C. 154(b) by 242 days.

(21) Appl. No.: 13/123,370

(22) PCT Filed: Sep. 25, 2009

(86) PCT No.: PCT/JP2009/004839
§ 371 (c)(1),
(2), (4) Date: Apr. 8, 2011

(87) PCT Pub. No.: WO2010/050115
PCT Pub. Date: May 6, 2010

(65) Prior Publication Data
US 2011/0192469 A1    Aug. 11, 2011

(30) Foreign Application Priority Data

Oct. 27, 2008 (JP) ................................. 2008-275088
Dec. 18, 2008 (JP) ................................. 2008-321923

(51) Int. Cl.
*F16L 55/00* (2006.01)
(52) U.S. Cl. .................... 137/318; 137/319; 285/197
(58) Field of Classification Search ......... 137/317–319; 285/197; 251/249.5, 901
See application file for complete search history.

(56) References Cited

U.S. PATENT DOCUMENTS

| 660,525 A | * | 10/1900 | Burritt | 137/318 |
|---|---|---|---|---|
| 990,580 A | * | 4/1911 | Mueller | 137/317 |
| 4,978,255 A | * | 12/1990 | Gale et al. | 408/1 R |
| 5,896,885 A | * | 4/1999 | Svetlik | 137/15.14 |
| 8,156,959 B2 | * | 4/2012 | Yamashita et al. | 137/319 |
| 2013/0000749 A1 | * | 1/2013 | Sato | 137/318 |

FOREIGN PATENT DOCUMENTS

| JP | 01-105091 A | 4/1989 |
|---|---|---|
| JP | 06-074387 A | 3/1994 |
| JP | 2002-321109 A | 11/2002 |
| JP | 2006-207747 A | 8/2006 |

OTHER PUBLICATIONS

International Search Report for corresponding International Application No. PCT/JP2009/004839 mailed Jan. 12, 2010.

* cited by examiner

*Primary Examiner* — Craig Schneider
*Assistant Examiner* — Ian Paquette
(74) *Attorney, Agent, or Firm* — Renner, Otto, Boisselle & Sklar, LLP

(57) ABSTRACT

A gear case part (70), which has an upper aperture that opens upward and which forms a recess that houses a portion of a drive gear device (63) and for which the drive gear device (63) can be inserted from the upper aperture and assembled, is provided integrally on the upper part of a first or second divided case (21, 22); a cover (66) that blocks the upper aperture of the gear case part (70) is fastened to the gear case part (70); an operating part (67) protrudes upward from a through-hole (66a) that vertically penetrates the cover (66); and by removing the cover (66) from the gear case part (70), the drive gear device (63) can be extracted from the gear case part (70) through the upper aperture.

15 Claims, 19 Drawing Sheets

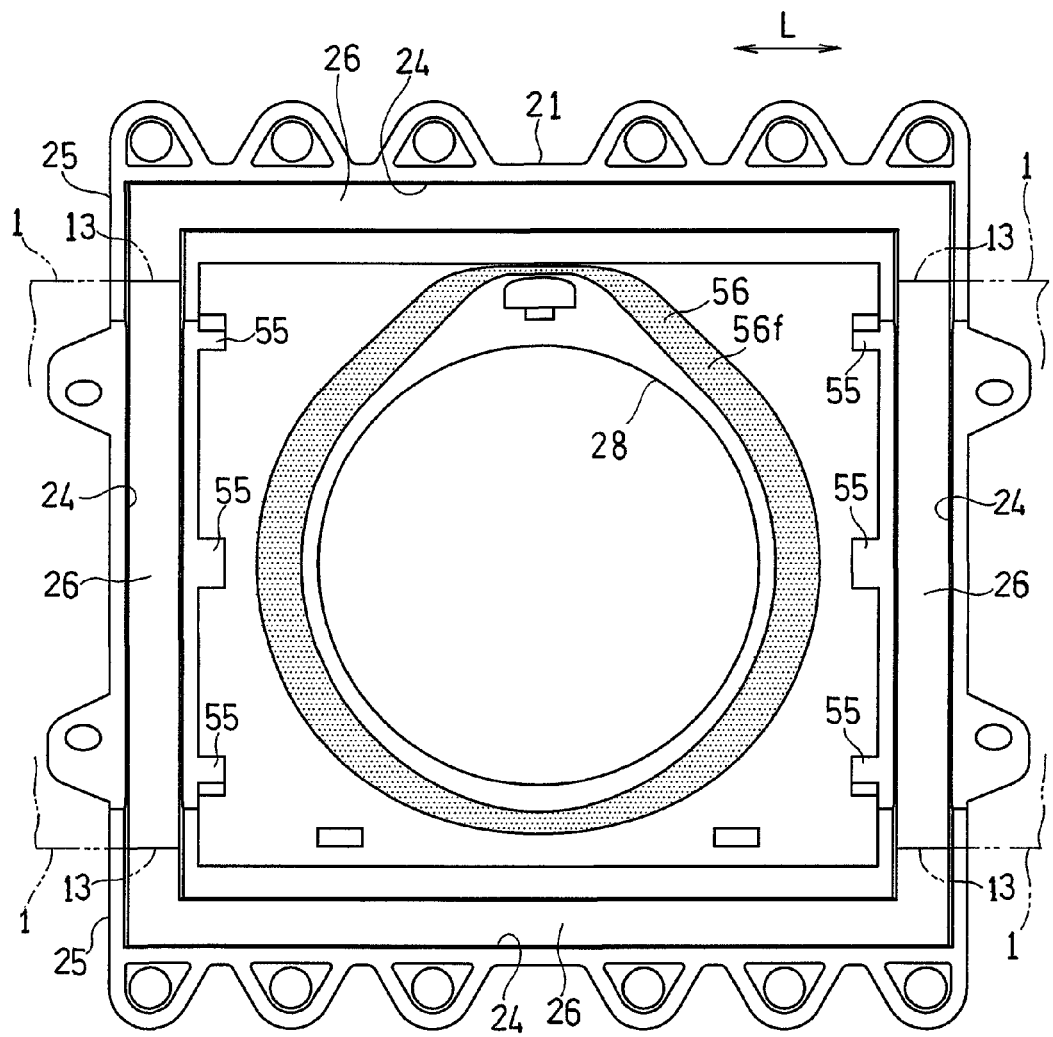

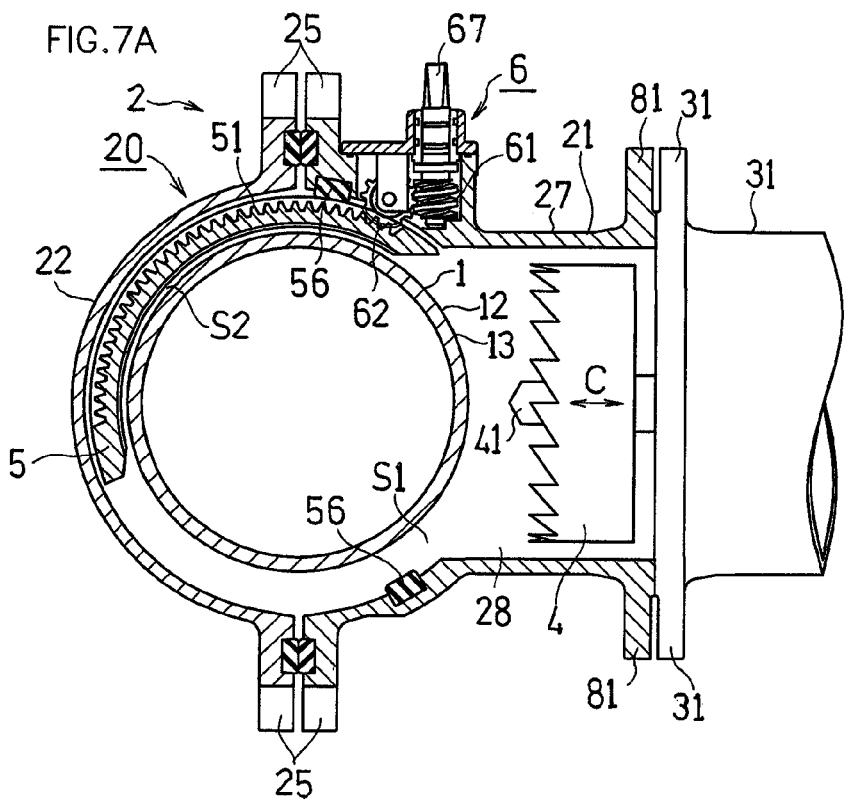
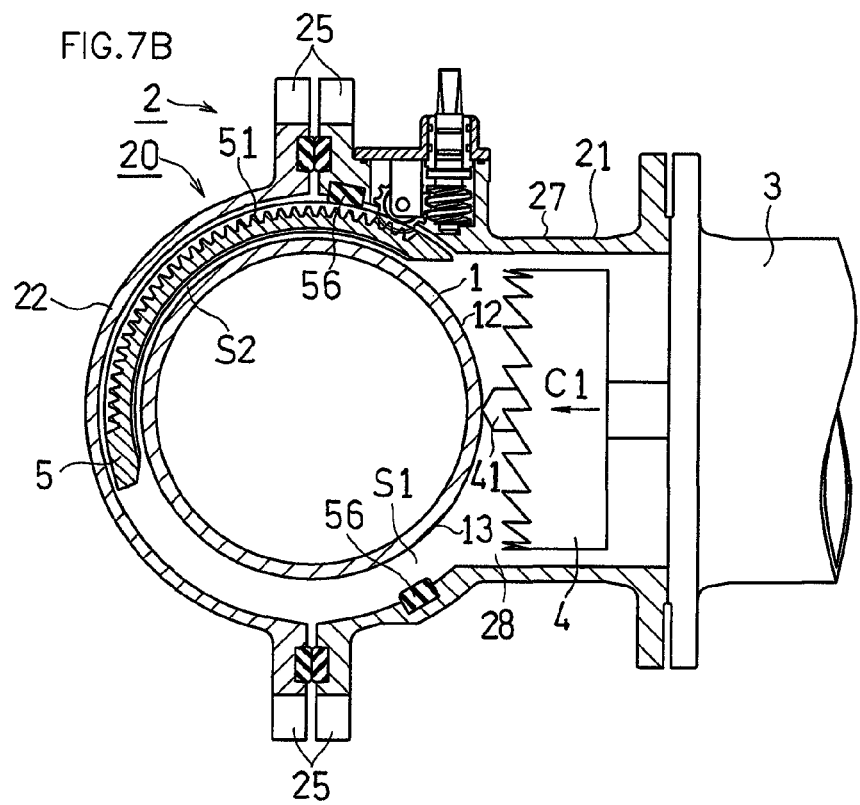

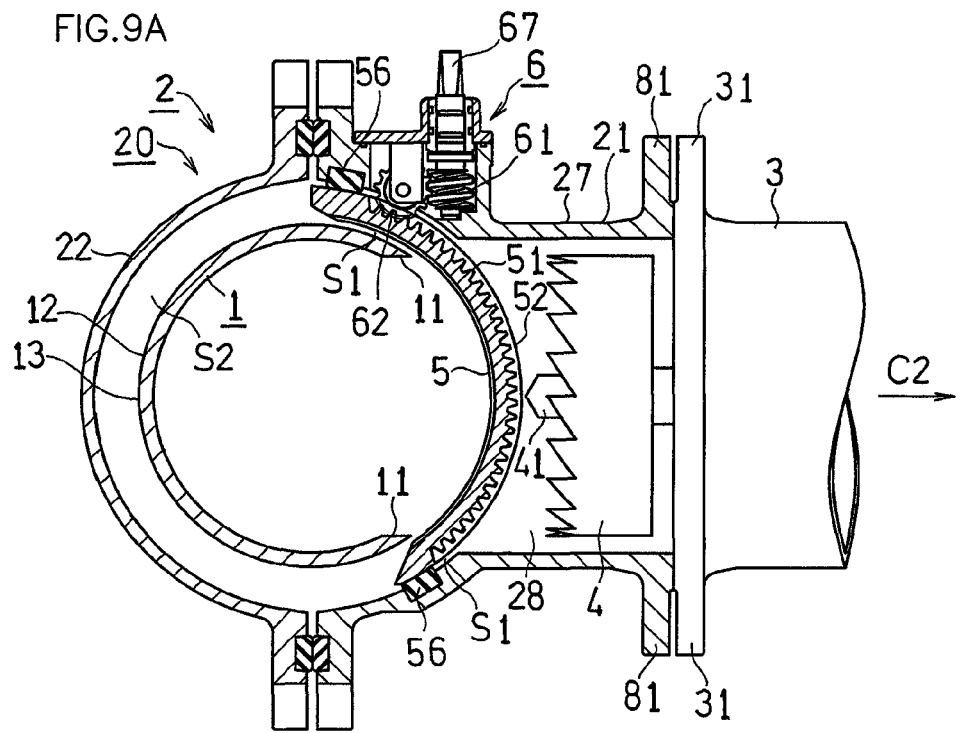
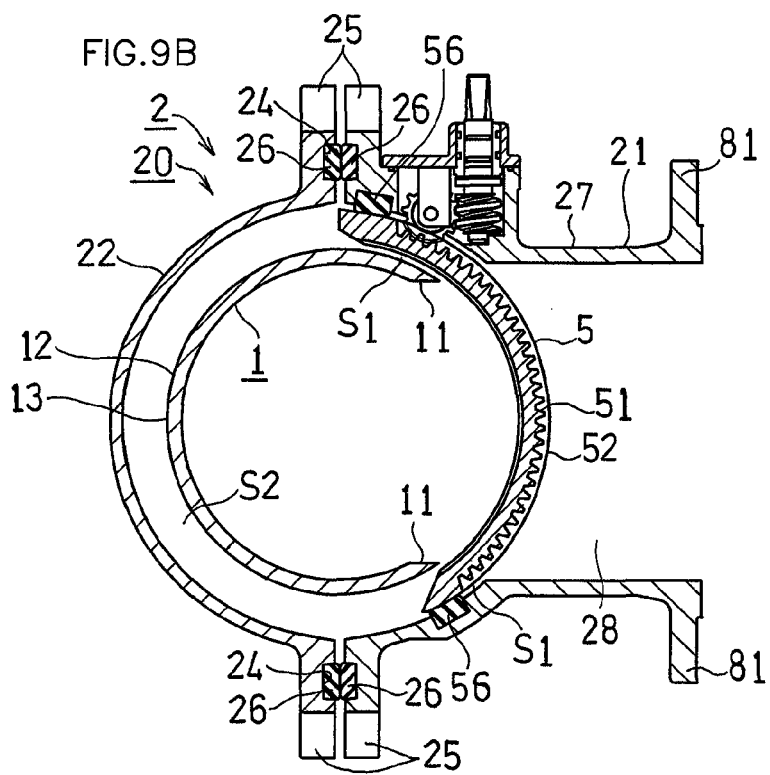

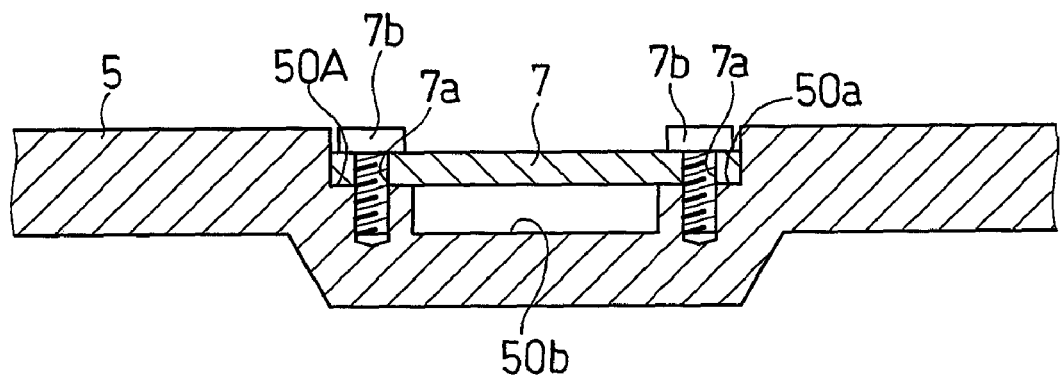
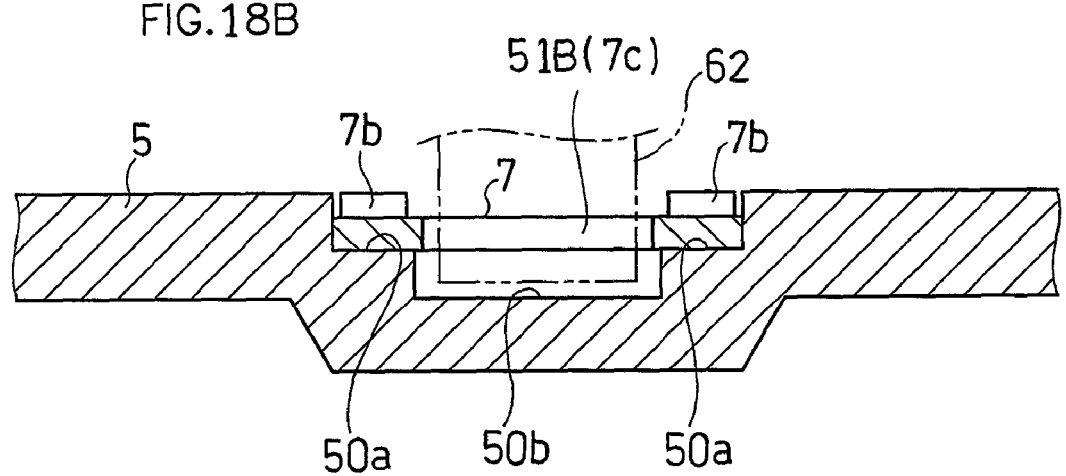

BRANCHING UNIT FOR BORING WITHOUT STOPPING PASSAGE OF FLUID

TECHNICAL FIELD

The present invention relates to a branching unit for flow-undisrupted boring (for boring without stopping a passage of fluid) suitable for providing a branch off of an existing pipe of water or gas.

BACKGROUND ART

There are known processes in the art for boring a portion of an existing pipe without disrupting the water supply using a boring machine having a hole saw (see the first patent document).

CITATION LIST

Patent Document

[FIRST PATENT DOCUMENT] Japanese Laid-Open Patent Publication No. 2002-321109

Basic procedures, etc., of boring operations of this type will be described briefly.

First, as shown in FIG. 12A, a portion of an existing pipe 1 is covered by a sealing case 2 composed of a pair of separate cases 21 and 22. A valve body 100 of a gate valve is provided in the first separate case 21. Then, a boring machine 3 is attached to the first separate case 21.

In this state, the boring machine 3 is operated so as to bore a circular opening 11 in the existing pipe 1 with a hole saw 4 at the tip by spinning the main shaft, as shown in FIG. 12B. Then, the hole saw 4 is retracted and then the valve body 100 is closed, as shown in FIG. 12C. After the boring operation is finished as described above, the boring machine 3 is removed, and a predetermined branch pipe is connected to the first separate case 21, after which the valve body 100 is opened, thus completing the branching operation.

SUMMARY OF INVENTION

With such a conventional unit, however, a large valve housing (valve casing) is additionally needed for accommodating the valve body 100 which moves up and down. This leads to an increase in the cost.

Moreover, the valve body 100 moves up and down at a position away from the existing pipe 1, which increases the stroke by which the hole saw 4 is advanced/retracted. This leads to an increase in the size of the boring machine 3.

Furthermore, since the valve body 100 moves up and down, a valve operation cap 101 is positioned high, thus requiring deeper earth covering.

The second patent document and the third patent document identified below each disclose a branching unit having an arc-shaped valve body accommodated between a saddle having a branch hole and an existing pipe. The valve body moves in the circumferential direction in one separate case to shut the branch hole.

[SECOND PATENT DOCUMENT] Japanese Laid-Open Patent Publication No. 6-74387
[THIRD PATENT DOCUMENT] Japanese Laid-Open Patent Publication No. 2006-207747

With these conventional techniques, however, if the saddle becomes bigger, it is necessary to install the valve body after installing the driving means from the rear surface of the heavy saddle, thus complicating the operation.

Thus, in view of the problems in the prior art, a primary object of the present invention is to provide a branching unit for flow-undisrupted boring which is inexpensive and capable of performing the operation with a short boring stroke and even with shallow earth covering. A further object of the present invention is to provide a branching unit which is easy to assemble.

In order to achieve the object set forth above, a branching unit of the present invention is a branching unit for flow-undisrupted boring suitable for boring a portion of a pipe wall of an existing pipe to form an opening in the pipe wall with a boring machine having a hole saw so as to connect a branch pipe to the existing pipe, including; a sealing case including first and second separate cases separated from each other in a circumferential direction of the existing pipe and enclosing a portion of the existing pipe, wherein a branch pipe portion to be branching off of the existing pipe by protruding in a radial direction of the existing pipe is formed integral with the first separate case; a valve body including a portion having an arc-shaped lateral cross section for opening/closing a branch hole of the branch pipe portion by rotating in the circumferential direction of the existing pipe between an inner periphery surface of the sealing case and an outer periphery surface of the existing pipe; a valve seat provided on the inner periphery surface of the first separate case with which the valve body contacts in a valve-closed state; and a rotation mechanism for rotating the valve body, the rotation mechanism including: an operation portion rotated outside the sealing case; a driving gear unit which rotates by (following) the rotation of the operation portion; and a driven gear provided on the valve body for rotating the valve body in the circumferential direction of the existing pipe following the rotation of the driving gear unit, wherein: a gear case portion is formed integral with an upper portion of the first or second separate case, the gear case portion having a lower opening which opens in a downward direction, allowing for a portion of the driving gear unit to mesh with the driven gear, and an upper opening which opens in an upward direction, wherein the gear case portion forms a depressed portion accommodating a portion of the driving gear unit, and allows the driving gear unit to be inserted and assembled through the upper opening; a cover which shuts the upper opening of the gear case portion is fastened to the gear case portion; the operation portion protrudes in the upward direction through a through hole vertically running through the cover; and the cover can be removed from the gear case portion so as to allow the driving gear unit to be taken out from the gear case portion through the upper opening.

With the present invention, since the portion of the valve body having an arc-shaped lateral cross section rotates along the existing pipe in the gap between the sealing case and the existing pipe, it is not necessary to separately provide a portion for accommodating the valve body such as a valve housing and a valve cover. Therefore, the unit is inexpensive and small.

Moreover, an arc-shaped valve body has a greater flexural strength than a flat plate-shaped valve body. Therefore, the valve body can be made thinner.

It is not necessary to separately provide a portion for accommodating the valve body. Therefore, the boring stroke is shorter.

Moreover, instead of moving up and down, the valve body rotates along the outer periphery surface of the existing pipe. Therefore, the valve height is lower. As a result, it is possible to perform the operation even with shallow earth covering.

On the other hand, with the provision of the gear case portion forming the depressed portion, the branching unit can be assembled by inserting the driving gear unit through the upper opening of the gear case portion and shutting the gear case portion with the cover. Therefore, it is no longer necessary to insert and assemble the driving gear unit from the rear side of the heavy separate case. That is, it is possible to install the driving gear unit through the upper opening. This significantly facilitates the operation of assembling the branching unit.

In the present invention, it is preferred that the first and second separate cases each include a curved surface portion extending along the existing pipe; and the gear case portion includes a side wall rising in the upward direction from the curved surface portion, and a flange which is formed integral with an upper end of the side wall and to which the cover is fastened.

With the present invention, a flange to which the cover is fastened is formed in an upper end of the side wall of the gear case portion, thereby facilitating the attachment and removal of the cover from above.

In the present invention, it is preferred that the driving gear unit includes a worm which rotates integral with the operation portion, and a worm wheel which rotates by (following) the rotation of the worm.

Here, if the valve body moves in the circumferential direction during the installment operation, the working efficiency of the installment decreases. There are vibrations from vehicles passing on the road surface after the completion of the boring operation, and if the valve body moves in the circumferential direction due to these vibrations, the branch hole may shut inadvertently.

In the present embodiment, the valve body does not move inadvertently by using a pair of gears including an irreversible worm and a worm wheel.

In the present invention, it is preferred that a bearing portion rotatably supporting the worm wheel is formed integral with the cover.

In the present embodiment, by attaching the worm wheel to the bearing portion which is formed in advance in the cover, it is possible to attach the cover and install the worm wheel simultaneously, thus significantly improving the working efficiency during assembly. Moreover, it is no longer necessary to separately provide a support member, or the like, for rotatably supporting the worm wheel, thereby simplifying the structure.

In the present invention, it is preferred that the gear case portion further includes a bottom wall portion rotatably supporting a lower end of the worm.

In the present embodiment, since the lower end of the worm is rotatably supported by contacting the bottom wall portion, it is no longer necessary to separately use a support member, or the like, for supporting the lower end of the worm, thus making it possible to form the gear case portion with a simple structure and improving the working efficiency of the installment because the worm does not fall in the downward direction.

In the present invention, it is preferred that the valve body has a concave surface curved along the outer periphery surface of the existing pipe, and a convex surface opposing the branch hole in the valve-closed state; and in the valve-closed state, a contact portion of the convex surface which is in contact with the valve seat protrudes past a surface of the driven gear in the radial direction of the existing pipe.

In the present embodiment, since the contact surface contacting the valve seat protrudes past the surface of the driven gear in the radial direction of the existing pipe, the gear will not bite into the valve seat, and the valve body can be moved smoothly.

In a preferred embodiment of the present invention, the contact portion is formed in a loop shape; the driven gear is formed on the valve body in an inner first region surrounded by the loop-shaped contact portion; and the valve seat is formed in a loop shape, and the branch hole and the lower opening are formed in the first separate case in an inner second region surrounded by the loop-shaped valve seat.

Here, in a water-undisrupted operation, disruption (stopping) of water supply is not acceptable even in the event of an unexpected incident. For example, there may be an event where the valve body which is closed after the completion of boring does not open due to a failure of the driving gear unit.

In such an event, the driven gear is formed in the inner region surrounded by the loop-shaped contact portion in the present embodiment. Therefore, in the valve-closed state, water pressure is not applied to the space inside the gear case portion. Therefore, water does not gush out even when the cover is removed, thereby allowing the cover to be removed for replacement of the driving gear unit.

A branching unit of the present invention is a branching unit for flow-undisrupted boring suitable for boring a portion of a pipe wall of an existing pipe to form an opening in the pipe wall with a boring machine having a hole saw so as to connect a branch pipe to the existing pipe, including: a sealing case including first and second separate cases separated from each other in a circumferential direction of the existing pipe and enclosing a portion of the existing pipe, wherein a branch pipe portion to be branching off of the existing pipe by protruding in a radial direction of the existing pipe is formed integral with the first separate case; a valve body including a portion having an arc-shaped lateral cross section for opening/closing a branch hole of the branch pipe portion by rotating in the circumferential direction of the existing pipe between an inner periphery surface of the sealing case and an outer periphery surface of the existing pipe; a valve seat provided on the inner periphery surface of the first separate case with which the valve body contacts in a valve-closed state; and a rotation mechanism for rotating the valve body, the rotation mechanism including: an operation portion rotated outside the sealing case; a driving gear unit which rotates following the rotation of the operation portion; and a driven gear provided on the valve body for rotating the valve body in the circumferential direction of the existing pipe following the rotation of the driving gear unit, wherein: the valve body is made of ductile cast iron, and a groove for attachment of the driven gear is formed in the valve body, extending in a circumferential direction of the valve body; and the driven gear made of stainless steel is attached to the groove.

Here, where the driven gear is made of ductile cast iron, the anticorrosive applied on the surface of the driven gear may be rubbed off as the driving gear unit meshes with the driven gear, thereby allowing the formation of rust.

In contrast, in the present embodiment, the driven gear is made of stainless steel, and therefore the anticorrosive effect does not deteriorate even if the surface of the driven gear is rubbed off.

As the valve body is formed by ductile cast iron and only the driven gear is formed by stainless steel, it is possible to significantly reduce the cost as compared with a case where the entire valve body is formed by stainless steel.

Here, for a valve unit used in a water pipe, or the like, the specification of whether the operation portion is rotated counterclockwise or clockwise in order to close the valve body is prescribed for each orderer, and orders are made based on the specification.

The teeth of the worm wheel are helical teeth, and therefore the driven gear of the valve body employs helical teeth so as to mesh with the worm wheel. Thus, the inclination of the helical teeth forming the worm wheel is reversed depending on the specification of whether the rotation for closing the valve body is counterclockwise or clockwise.

Thus, the inclination of the driven gear which meshes the worm wheel differs depending on whether the valve is left-handed or right-handed.

For this, by selecting the driven gear to be attached depending on the valve specification, it is possible to accommodate both the left-handed and right-handed specifications.

In a preferred embodiment of the present invention, the driven gear is formed by a stainless steel cast product.

In a preferred embodiment of the present invention, the driven gear includes a plurality of through holes formed in parallel to one another in a stainless steel plate material, forming the driven gear.

BRIEF DESCRIPTION OF THE DRAWINGS

FIG. 5 is a schematic side view showing a first separate case.

FIGS. 7A and 7B are schematic cross-sectional views of the branching unit, etc., showing a flow-undisrupted boring method.

FIGS. 9A and 9B are schematic cross-sectional views of the branching unit, etc., showing the flow-undisrupted boring method.

FIGS. 15A to 15G are directed to Embodiment 7, wherein FIGS. 15A and 15B are a side view and a front view, respectively, of a driven gear, FIGS. 15C and 15D are a side view and a front view, respectively, of a valve body, FIGS. 15E and 15F are a side view and a front view, respectively, of the valve body where the driven gear is attached to the valve body, and FIG. 15G is a front view showing a left-handed valve body.

FIGS. 17A to 17E are directed to Embodiment 8, wherein FIG. 17A is a side view of a driven gear made of a plate material, FIGS. 17B and 17C are a side view and a front view, respectively, of a valve body to which the plate material is not attached, FIG. 17D is a side view of the valve body to which the plate material is attached, and FIG. 17E is a partially-cross-sectional side view showing worm teeth.

FIGS. 18A and 18B are schematic end view in which the plate material is attached to the valve body.

DESCRIPTION OF EMBODIMENTS

Figure 1:
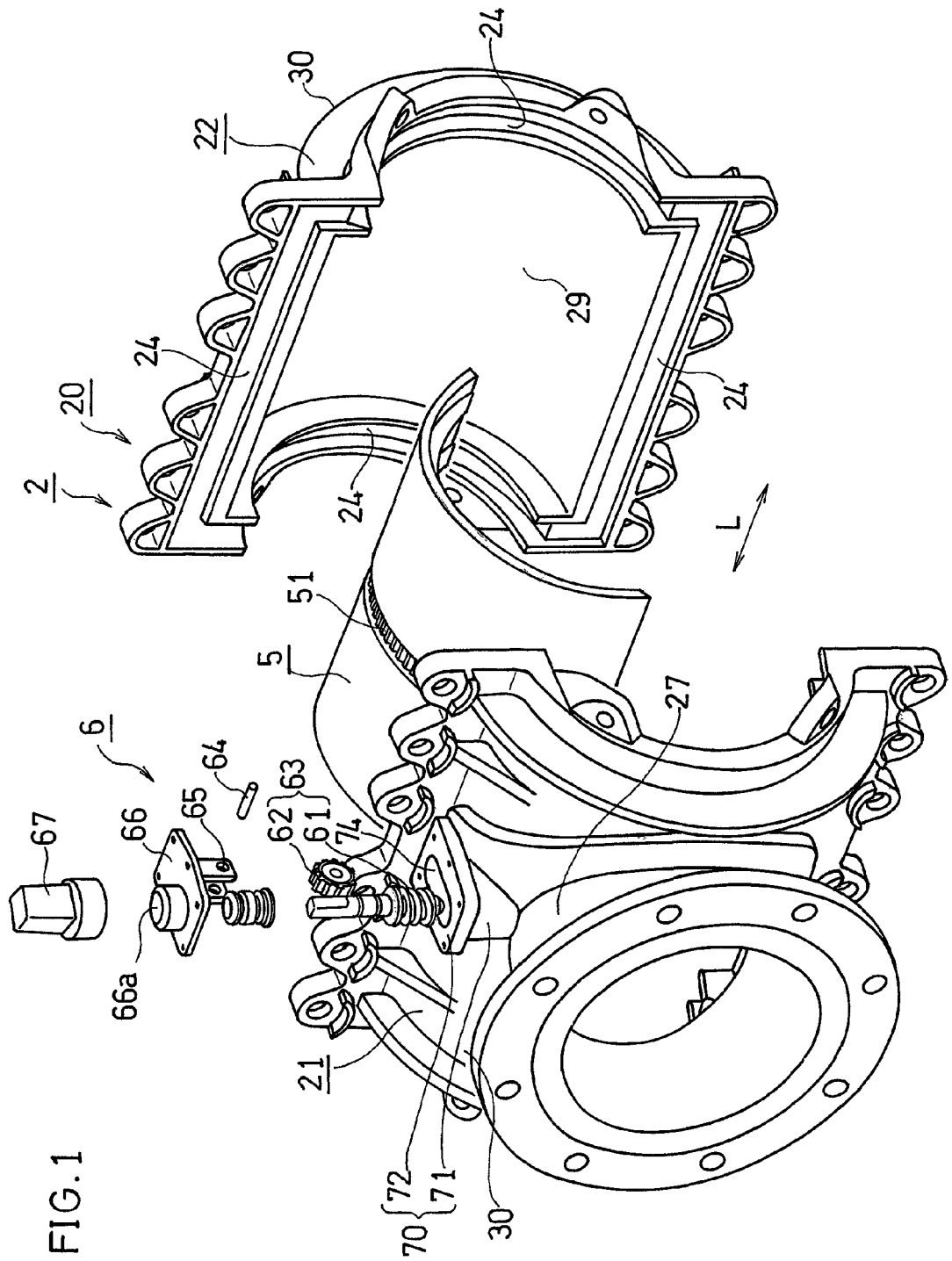
FIG. 1 is an exploded perspective view showing a branching unit according to Embodiment 1 of the present invention.

The present invention will be understood more clearly from the following description of preferred embodiments taken in conjunction with the accompanying documents. However, the embodiments and the drawings are merely illustrative, and shall not be relied upon in defining the scope of the present invention. The scope of the present invention shall be defined only by the appended claims. In the accompanying drawings, like reference numerals denote like components throughout the plurality of figures.

Embodiments of the present invention will now be described with reference to the drawings.

Embodiment 1

FIGS. 1 to 11 show Embodiment 1.

First, the general configuration of the present branching unit will be described.

Figure 2:
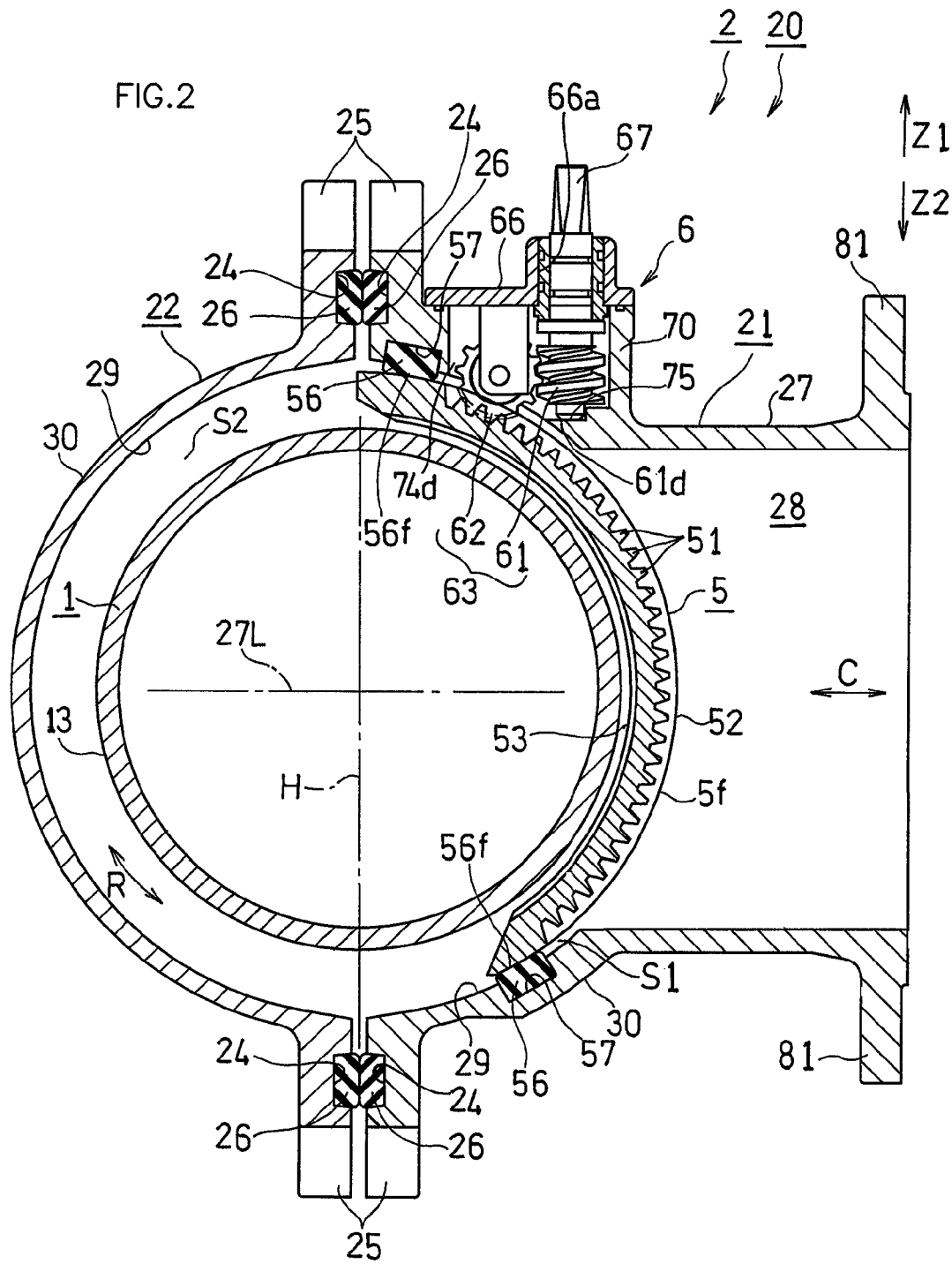
FIG. 2 is a schematic cross-sectional view showing the branching unit.
Figure 8A:
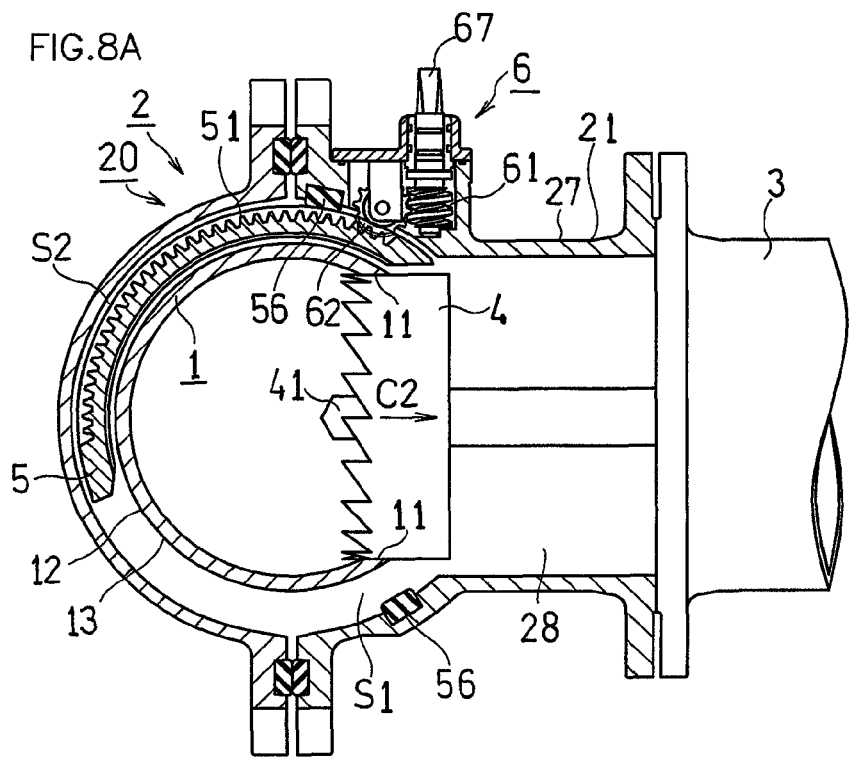
FIGS. 8A and 8B are schematic cross-sectional views of the branching unit, etc., showing the flow-undisrupted boring method.

Branching Unit 2:

A branching unit 2 shown in FIGS. 1 and 2 is used in flow-undisrupted boring, in which a branch is provided off of an existing pipe 1 while a fluid (e.g., water, etc.) is flowing through the inside of the existing pipe 1. That is, the branching unit 2 is for boring a portion of a pipe wall 12 of the existing pipe 1 with a boring machine 3 having a hole saw 4, as shown in FIG. 8A.

As shown in FIG. 2, the branching unit 2 includes a sealing case 20 for enclosing the existing pipe 1. The sealing case 20 includes first and second separate cases 21 and 22 which are separated from each other in the circumferential direction R of the existing pipe 1. A branch pipe portion 27 to be branching off of the existing pipe 1 by protruding in the radial direction C of the existing pipe 1 is formed integral with the first separate case 21.

Separate Cases 21 and 22:

The first and second separate cases 21 and 22 are separated from each other along a virtual plane H which is generally orthogonal to an axis 27L of the branch pipe portion 27. The pair of separate cases 21 and 22 are attached from outside to the existing pipe 1 from opposite sides in the radial direction C of the existing pipe 1 and are assembled together by fastening coupling portions 25 thereof to each other by assembling bolts (not shown).

As shown in FIGS. 1 and 2, the separate cases 21 and 22 each have an inner periphery surface 29 which is curved generally along an outer periphery surface 13 of the existing pipe 1. As shown in FIGS. 1, 2 and 5, groove-shaped gasket attachment portions 24 are formed along the coupling portions 25 and opposite end portions of the inner periphery surface 29 in the pipe axis direction L of the existing pipe 1 of the separate cases 21 and 22. Rubber gaskets 26 are attached to the gasket attachment portions 24, thereby sealing between the existing pipe 1 and the branching unit 2 and between the first separate case 21 and the second separate case 22.

Note that bolt insertion holes (not shown) may be further provided in the opposite end portions of the separate cases 21 and 22 in the pipe axis direction L, and the opposite end portions may be fastened together by assembling bolts.

Figure 8B:
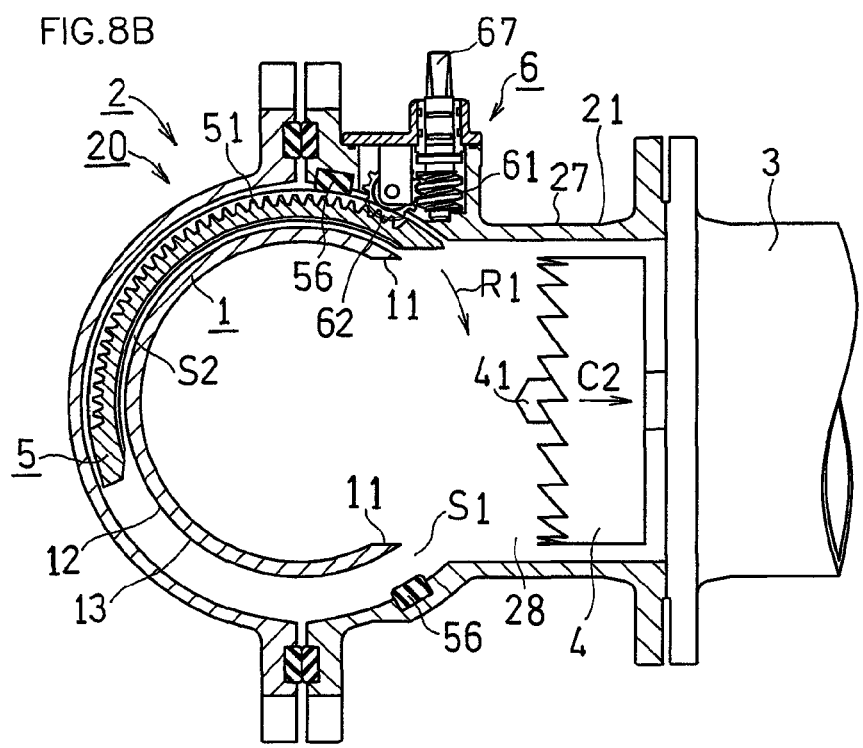

Branch Pipe Portion 27:

As shown in FIG. 7A, the boring machine 3 is attached to a joint portion 81, which is like a plate-shaped flange, for example, of the branch pipe portion 27. As the hole saw 4, while spinning, is passed toward the radial direction C of the existing pipe 1 through a branch hole 28 of the branch pipe portion 27, the pipe wall 12 of the existing pipe 1 is cut as shown in FIG. 8A, thereby boring the opening 11 in the existing pipe 1 as shown in FIG. 8B. Note that a center drill 41 for positioning the hole saw 4 is provided at the center of rotation of the hole saw 4 so as to protrude toward the existing pipe 1, as shown in FIG. 7B.

Valve Body 5:

As shown in FIG. 2, first and second spaces S1 and S2 are provided between the existing pipe 1 and the first and second separate cases 21 and 22, respectively. The first space S1 and the second space S2 communicate with each other in the circumferential direction R, and accommodate a valve body 5 which has an arc-shaped lateral cross section so that the valve body 5 can be moved between the two separate cases 21 and 22. The valve body 5 opens/closes the branch hole 28 of the branch pipe portion 27 by rotating along the inner periphery surfaces 29 of the separate cases 21 and 22 and the outer periphery surface 13 of the existing pipe 1 and in the circumferential direction R of the existing pipe 1.

That is, the majority of the valve body 5 is accommodated in the second space S2 in the valve-open state of FIG. 7A and the boring state of FIG. 8A, whereas the majority of the valve body 5 is accommodated in the first space S1, thus shutting the branch hole 28, in the valve-closed state of FIGS. 9A and 9B after being rotated by a rotation mechanism 6.

A guide portion 55 (see FIG. 5) for guiding the rotation of the arc-shaped valve body 5 is provided integral with the separate cases 21 and 22.

By rotating the valve body 5 in the circumferential direction R of the existing pipe 1, it is possible to rotationally move the valve body 5 between the valve-open position shown in FIG. 7A and the valve-closed position shown in FIG. 9A.

A sealing rubber ring (an example of the valve seat) 56 is attached, in a generally circumferential pattern, to a rubber ring attachment groove 57 in the first separate case 21 having the branch pipe portion 27 shown in FIG. 2 along the perimeter around the branch hole 28 of the branch pipe portion 27 and a gear case portion 70 thereof to be described later.

As the valve body 5 is rotationally moved to the valve-closed position shown in FIG. 9A a first contact portion 5$f$ indicated by a dotted area in the valve body 5 of FIG. 6 comes into close contact with a second contact portion 56$f$ of the rubber ring 56 indicated by a dotted area of FIG. 5. This shuts the branch hole 28, as shown in FIG. 9A, thus sealing the space around the opening 11 of the existing pipe 1 with the separate cases 21 and 22 and the valve body 5.

Figure 6A:
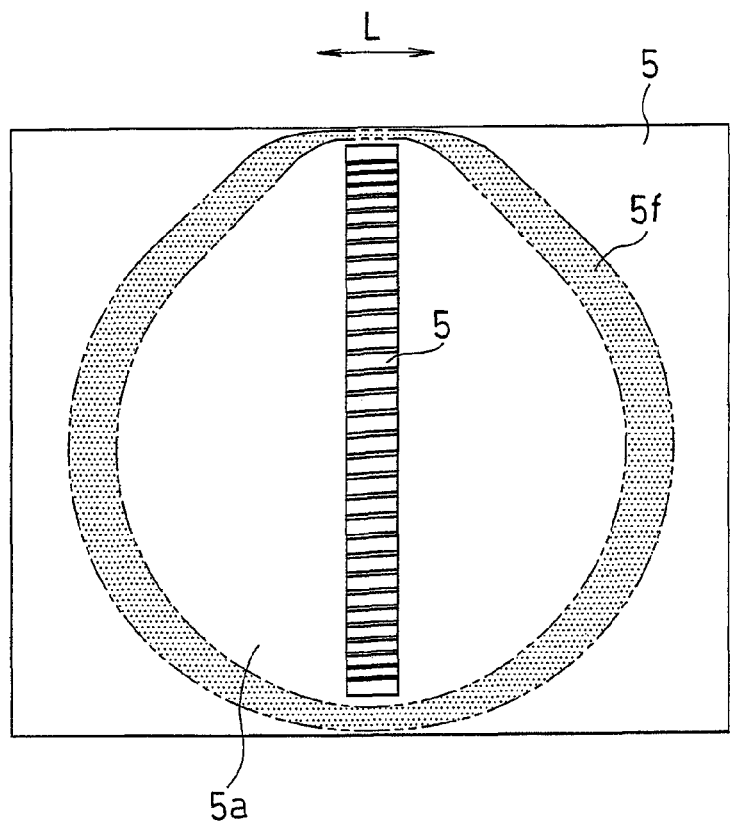
FIG. 6A is a schematic side view showing a valve body.
Figure 6B:
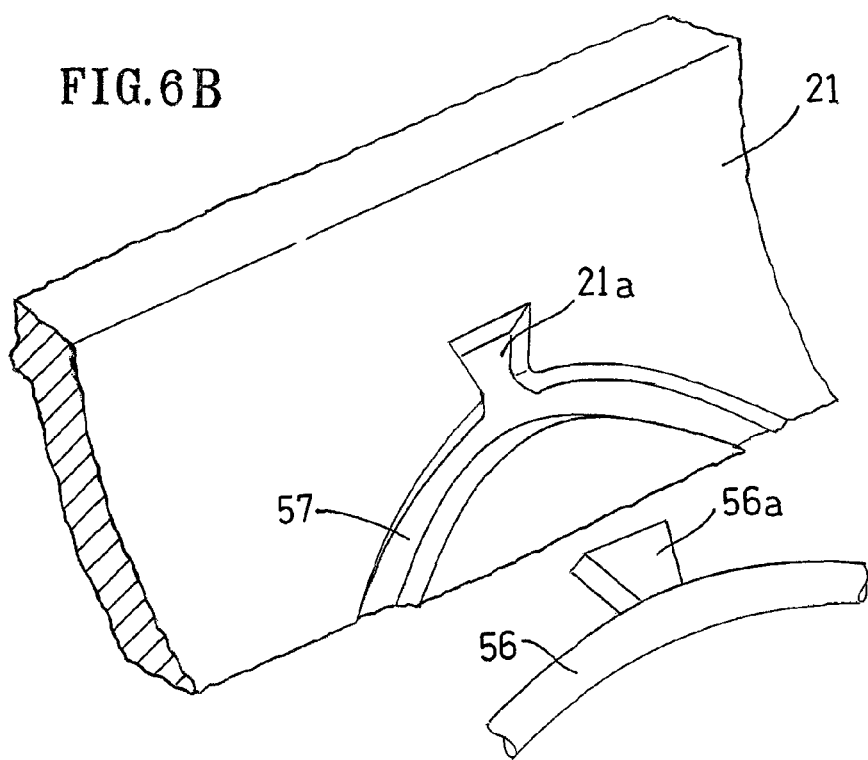
FIG. 6B is a schematic perspective view showing how a rubber ring is fixed.

It is preferred that a dovetail groove 21$a$ is formed in the first separate case 21 and a protruding portion 56$a$ which fits into the dovetail groove 21$a$ is formed integral with the rubber ring 56, as shown in FIG. 6B. In such a case, it is possible to prevent the rubber ring 56 from being taken off by the strong water flow when the closed valve body 5 is opened.

Through holes (not shown) are formed in opposite end portions of the valve body 5. The provision of the through holes in the valve body 5 allows for powder coating while hanging the valve body 5 with hooks through the through holes, and also reduces the weight of the valve body 5.

Next, important parts of the present invention will be described in greater detail.

Rotation Mechanism 6:

The rotation mechanism 6 for rotating the valve body 5 is provided in the sealing case 20 shown in FIG. 2.

The rotation mechanism 6 includes an operation portion 67 rotated outside the sealing case 20, a driving gear unit 63 which rotates following the rotation of the operation portion 67, and a driven gear 51 provided on the valve body 5 for rotating the valve body 5 along the circumferential direction R of the existing pipe 1 following the rotation of the driving gear unit 63.

The driving gear unit 63 includes a worm 61 which rotates integral with the operation portion 67, and a worm wheel 62 which rotates following the rotation of the worm 61. The worm 61 and the worm wheel 62 mesh with each other, and the driven gear 51 meshes with the worm wheel 62. Note that the axial direction of the worm 61 is set to the vertical direction.

On the other hand, as shown in FIG. 6A, the driven gear 51 is provided generally at the center of the valve body 5 in the pipe axis direction L. As shown in FIG. 2, the worm wheel 62 protrudes from a depressed portion 73 (FIG. 3) to be described later into the first space S1. The driven gear 51 meshes with the worm wheel 62, and rotates in the circumferential direction R following the rotation of the worm wheel 62, thereby rotating the valve body 5.

That is, when an operator rotates the operation portion 67, the driven gear 51 is rotated via the worm 61 and the worm wheel 62, thereby rotating the valve body 5.

Therefore, the operation portion 67, the driving gear unit 63 (the worm 61, the worm wheel 62) and the driven gear 51 together form the rotation mechanism 6 for rotating the valve body 5.

Figure 3:
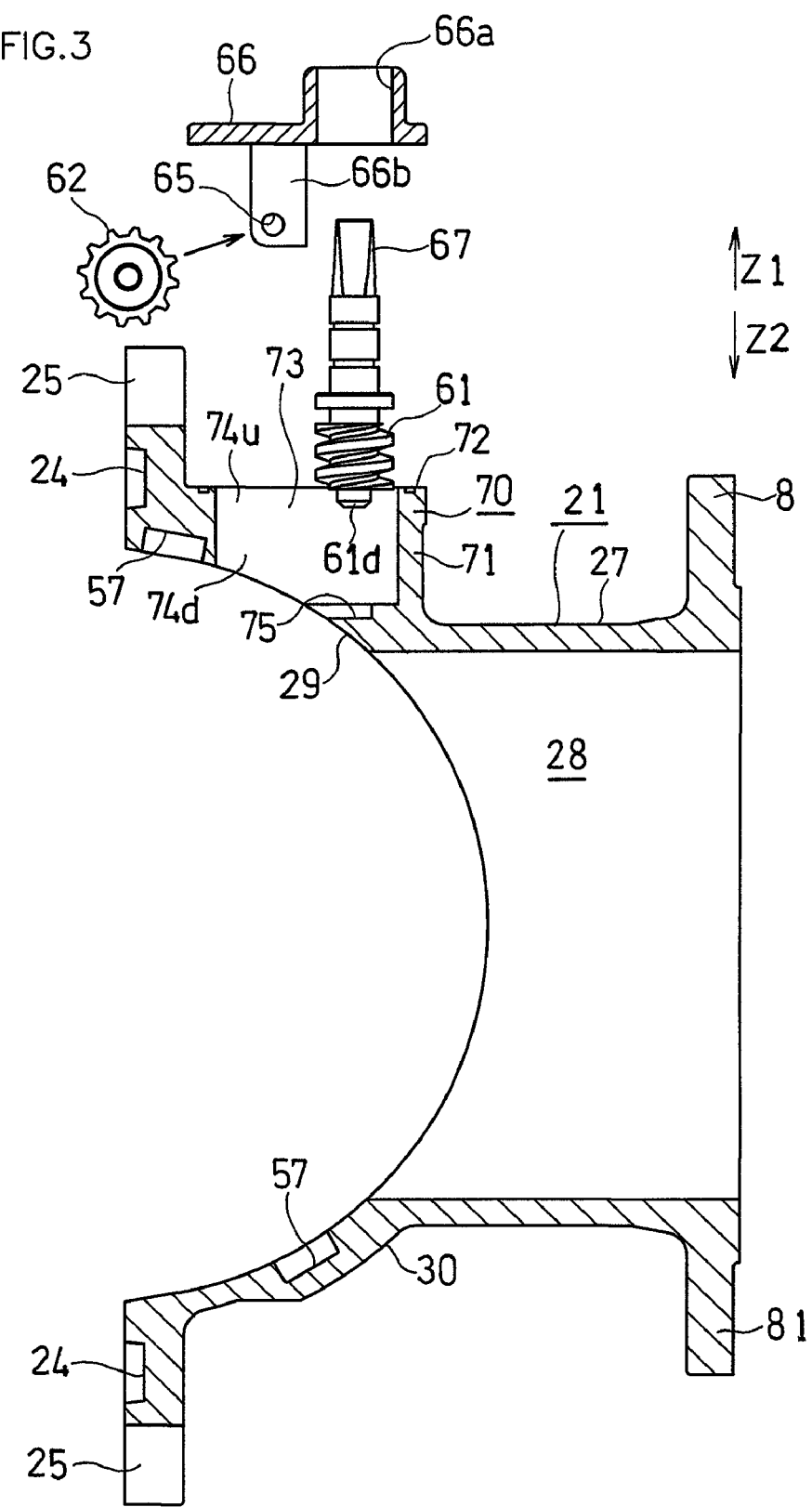
FIG. 3 is an exploded schematic cross-sectional view showing a first separate case.

Gear Case Portion 70:

The gear case portion 70 is formed integral with the first separate case 21 in an upper portion of the first separate case 21. As shown in FIG. 3, the gear case portion 70 has a lower opening 74$d$ which opens in the downward direction Z2, allowing for the worm wheel 62 to mesh with the driven gear 51, and an upper opening 74$u$ which opens in the upward direction Z1. The gear case portion 70 forms the depressed portion 73 accommodating a portion of the driving gear unit 63. The driving gear unit 63 can be inserted and assembled through the upper opening 74$u$.

As shown in FIGS. 1 and 2, the first and second separate cases 21 and 22 each have a curved surface portion 30 extending along the existing pipe 1. As shown in FIG. 1, the gear case portion 70 includes a side wall 71 rising in the upward direction from the curved surface portion 30 of the first separate case 21, and a flange 72 which is formed integral with the upper end of the side wall 71 and to which the cover 66 is fastened. Therefore, the cover 66 is fastened to the gear case portion 70 by bolts (not shown) via the flange 72, thereby shutting the upper opening 74$u$ of the gear case portion 70. Note that a rubber gasket (not shown) is interposed between the cover 66 and the flange 72.

Attachment of Driving Gear Unit 63 to Cover 66:

As shown in FIG. 3, the operation portion 67 is formed integral with an upper portion of the worm 61.

Figure 4:
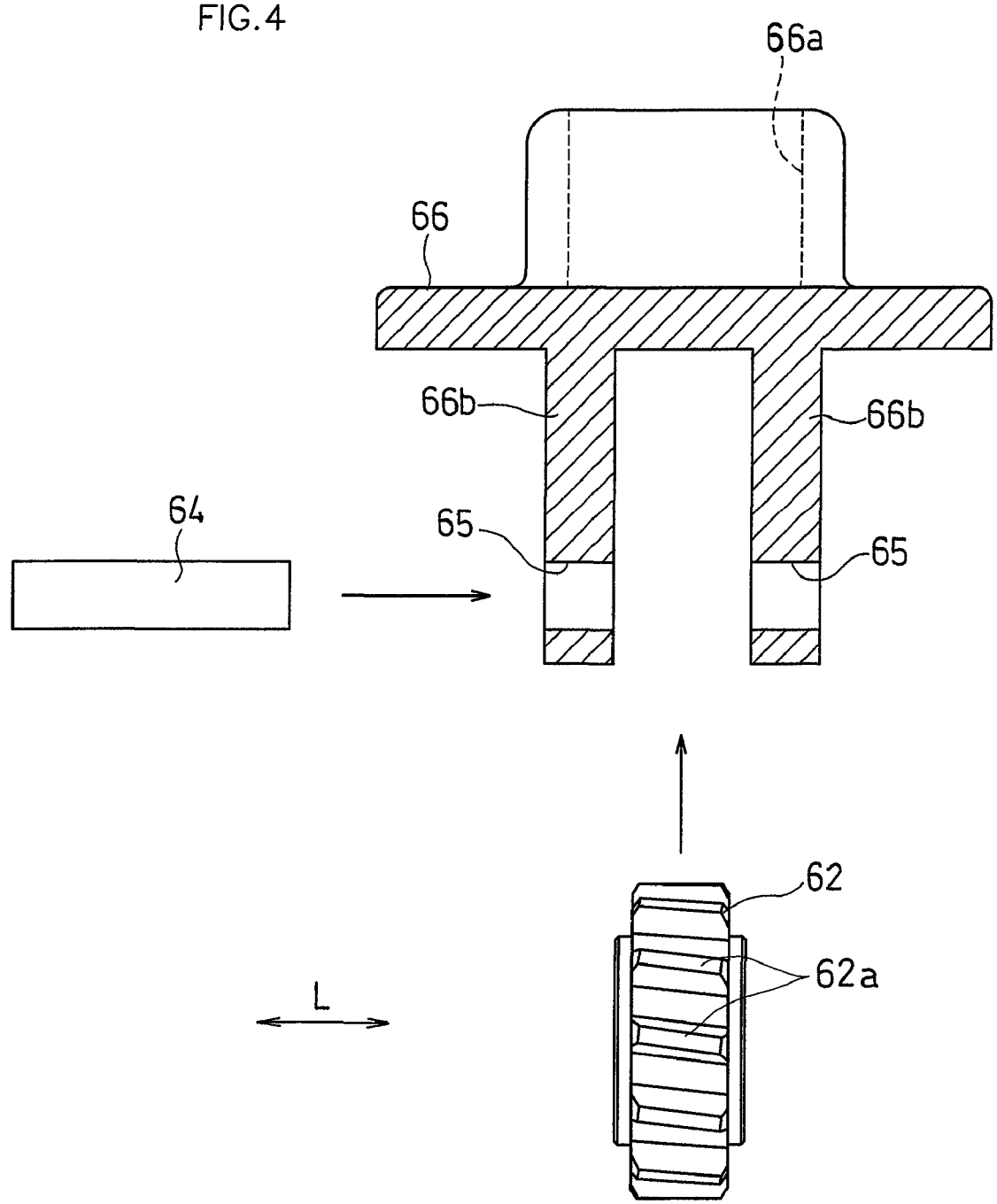
FIG. 4 is an exploded schematic side view showing how a worm wheel is attached to a cover.

On the other hand, as shown in FIG. 4, a support portion 66$b$ is formed integral with a lower portion of the cover 66, and a bearing portion (hole) 65 is formed in the support portion 66$b$. A rotation shaft 64 for rotatably supporting the worm wheel 62 is inserted through the bearing portion 65.

With the rotation shaft 64 inserted through the worm wheel 62 and the bearing portion 65, the worm wheel 62 is rotatably attached to the cover 66, as shown in FIG. 2.

On the other hand, a through hole 66a vertically running through the cover 66 is formed in the cover 66 shown in FIG. 3. The worm 61 is rotatably attached to the through hole 66a of the cover 66 so as to mesh with the worm wheel 62, as shown in FIG. 2. With the worm 61 attached to the cover 66, the operation portion 67 formed in an upper portion of the worm 61 protrudes in the upward direction Z1 through the through hole 66a.

Thus, the driving gear unit 63 composed of the worm 61 and the worm wheel 62 and the operation portion 67 can be attached in advance to the cover 66. This attachment is done during shipment, but may be done on site.

Installation of Cover 66:

As shown in FIG. 3, the lower opening 74d which opens in the downward direction Z2 is formed in the depressed portion 73. As shown in FIG. 2, when inserting and assembling the driving gear unit 63 into the depressed portion 73 through the upper opening 74u, a portion of the worm wheel 62 protrudes toward the valve body 5 through the lower opening 74d, thus meshing the worm wheel 62 with the driven gear 51 of the valve body 5.

On the other hand, as shown in FIGS. 2 and 3, a bottom wall portion 75 for rotatably supporting a lower end 61d of the worm 61 is formed integral with the gear case portion 70.

Therefore, when the cover 66 is installed on the gear case portion 70, the worm wheel 62 is meshed with the driven gear 51, and the lower end 61d of the worm 61 is rotatably supported by the bottom wall portion 75 of the first separate case 21.

In the present embodiment, the worm wheel 62 is rotatably supported by the rotation shaft 64 inserted through the bearing portion 65, and the lower end 61d of the worm 61 is rotatably supported by the bottom wall portion 75 of the first separate case 21. Therefore, the driving gear unit 63 (the worm 61, the worm wheel 62) does not fall through the lower opening 74d.

On the other hand, when the driving gear unit 63 (the worm 61, the worm wheel 62) shown in FIG. 2 is taken out from the sealing case 20, the cover 66 is taken out in the upward direction Z1. Since the driving par unit 63 is attached to the cover 66, as described above, when the cover 66 is taken out from the gear case portion 70, the driving gear unit 63 is taken out from the gear case portion 70 through the upper opening 74u above.

Valve Body 5 and Rubber Ring 56:

The valve body 5 has a concave surface 53 curved along the outer periphery surface 13 of the existing pipe 1, and a convex surface 52 opposing the branch hole 28 in the valve-closed position shown in FIGS. 9A and 9B.

In the valve-closed position shown in FIG. 2, the first contact portion 5f of the convex surface 52 of the valve body 5 which is in contact with the second contact portion 56f of the rubber ring 56 protrudes past the surface of the driven gear 51 in the radial direction C of the existing pipe 1.

As shown in FIG. 6, in the valve-closed position (FIG. 2), the first contact portion 5f (the portion indicated by a dotted area) with which the rubber ring 56 (FIG. 5) contacts is formed in a loop shape. The driven gear 51 is formed on the valve body 5 in a region 5a inside the loop-shaped first contact portion 5f (the portion indicated by a dotted area).

As shown in FIG. 4, the worm wheel 62 is formed by helical teeth 62a which are formed inclined with respect to the pipe axis direction L of the existing pipe 1 (FIG. 2) so as to mesh with the worm 61. On the other hand, as shown in FIG. 6, the driven gear 51 of the valve body 5 is formed by helical teeth so as to mesh with the worm wheel 62 (FIG. 4).

The driven gear 51 formed on the valve body 5 is formed in an inclined direction. Therefore, as the driven gear 51 meshes with the worm wheel 62, a rotational force acts upon the cover 66. In order to prevent the rotation of the cover 66, it is preferred that the support portion 66b of the cover 66, etc., engage with the depressed portion 73.

For example, a tar epoxy resin, or the like, is applied on the surface of the driven gear 51, and powder coating is applied on a portion of the valve body 5 excluding the driven gear 51.

Flow-Undisrupted Boring Method (Boring Method Without Stopping A Passage of Fluid):

First, with a fluid flowing inside the existing pipe 1 of FIG. 2, the branching unit 2 is attached so as to enclose the outer periphery surface 13 of the existing pipe 1. After the attachment, the operator assembles together the separate cases 21 and 22 with the assembling bolts.

Note that the valve body 5 is first set to the valve-closed position where the branch hole 28 of the branch pipe portion 27 is closed. A waterproof test may be performed for checking whether there is no water leak by injecting water between the sealing case 20 in the valve-closed state and the existing pipe 1.

Then, the valve is opened as shown in FIG. 7A, and the operator further attaches a joint portion 31 of the boring machine 3 to the joint portion 81 of the branch pipe portion 27 using bolts. Thus, the branching unit 2 airtightly encloses a portion of the existing pipe 1.

After the enclosure, as the hole saw 4 is moved in the boring direction C1 toward the existing pipe 1 while spinning the hole saw 4 as shown in FIG. 7B, the center drill 41 cuts the pipe wall 12 of the existing pipe 1, thereby positioning the hole saw 4 spinning about the center drill 41 with respect to the existing pipe 1. Then, as shown in FIG. 8A, a portion of the pipe wall 12 of the existing pipe 1 is cut off by the hole saw 4, thus forming the opening 11.

After boring by the center drill 41 and the hole saw 4, the hole saw 4 is moved in the retracting direction C2 as shown in FIG. 8B.

Then, as the operator rotates the operation portion 67, the worm wheel 62 which meshes with the worm 61 rotates, and the valve body 5 is guided by the guide portion 55 (FIG. 5) by means of the driven gear 51 which meshes with the worm wheel 62 so as to be rotated in the valve-closing direction R1 of the branch hole 28, thus moving the valve body 5 in the valve-open position to the valve-closed position shown in FIG. 9A. As the valve body 5 moves into the valve-closed position, the valve body 5 closely contacts the surface of the rubber ring 56, thus shutting the branch hole 28.

Figure 10A:
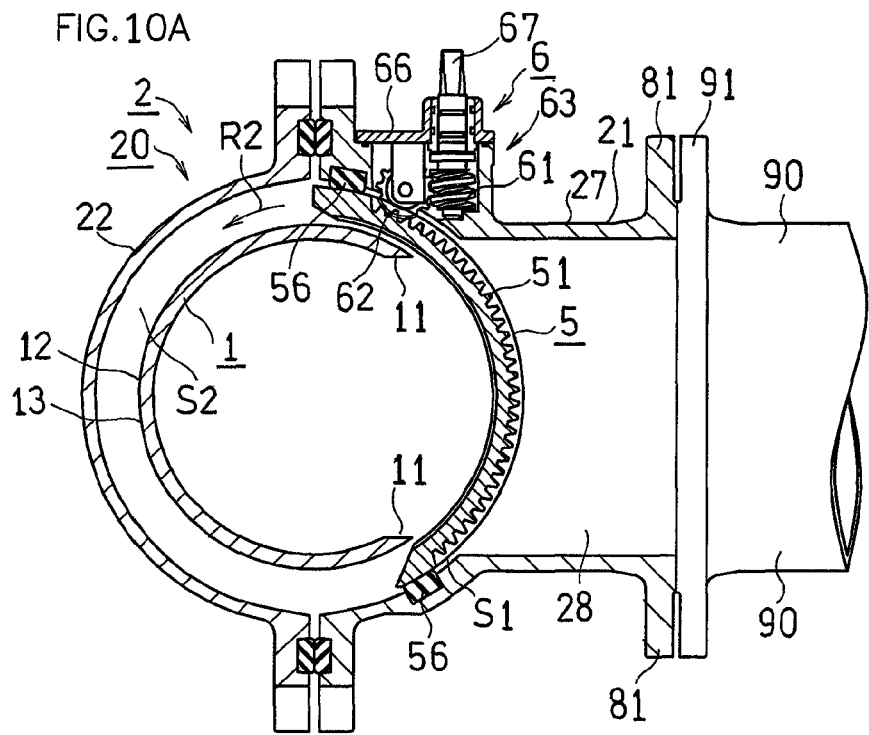
FIGS. 10A and 10B are schematic cross-sectional views of the branching unit, etc., showing the flow-undisrupted boring method.

After the shutting, the boring machine 3 is taken out from the branching unit 2 as shown in FIG. 9B. After the boring machine 3 is taken out, a joint portion 91 of a branch pipe 90 is connected to the joint portion 81 of the branch pipe portion 27 as shown in FIG. 10A using bolts (not shown).

Figure 10B:
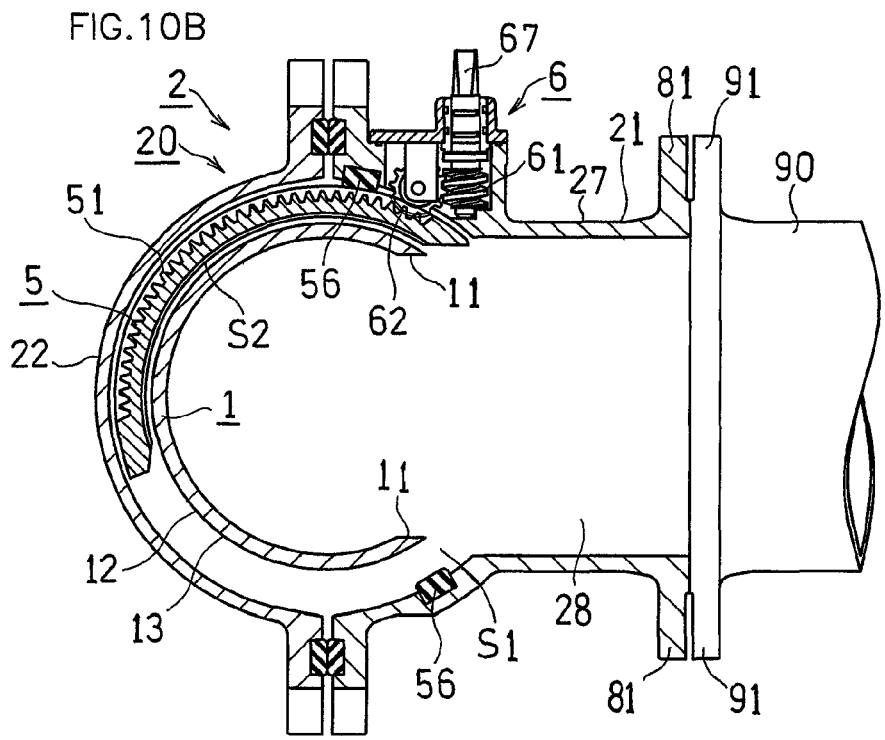

After the branch pipe is completely finished (installed), the operator rotates the operation portion 67 in the valve-opening direction so as to rotate the valve body 5 in the valve-opening direction R2 to the valve-open position shown in FIG. 10B, thus allowing water through the branch pipe 90.

Note that if the driving gear unit 63 malfunctions, and the valve body 5 cannot be rotated in the valve-opening direction R2, the cover 66 can be removed and the driving gear unit 63 can be taken out.

Next, other embodiments will be described. Each of the embodiments below will be described while focusing on the difference from Embodiment 1 described above.

Embodiment 2

Figure 11:
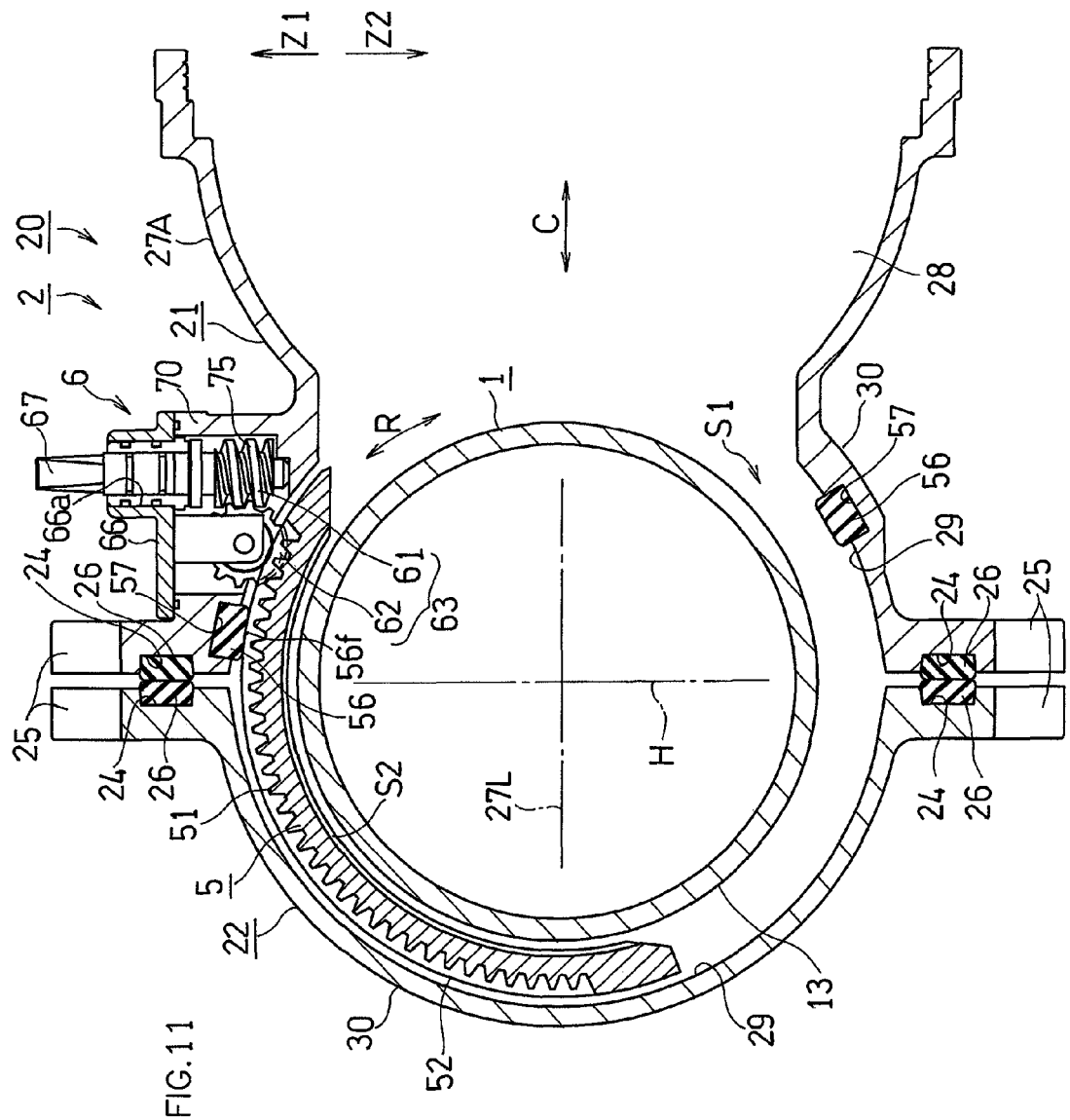
FIG. 11 is a schematic cross-sectional view showing a branching unit illustrating Embodiment 2.
Figure 12A:
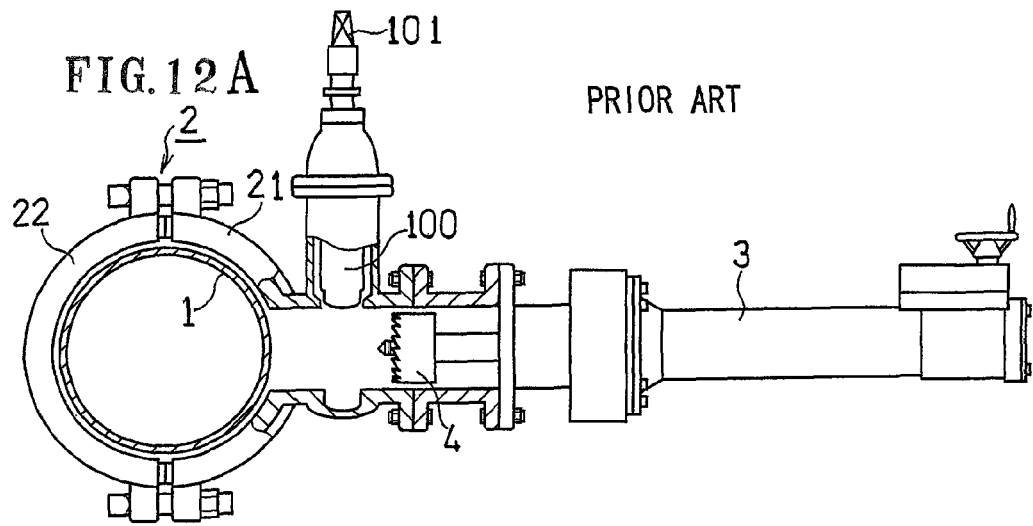
FIGS. 12A, 12B and 12C are schematic cross-sectional views of a unit, etc., showing a conventional flow-undisrupted boring method.
Figure 12B:
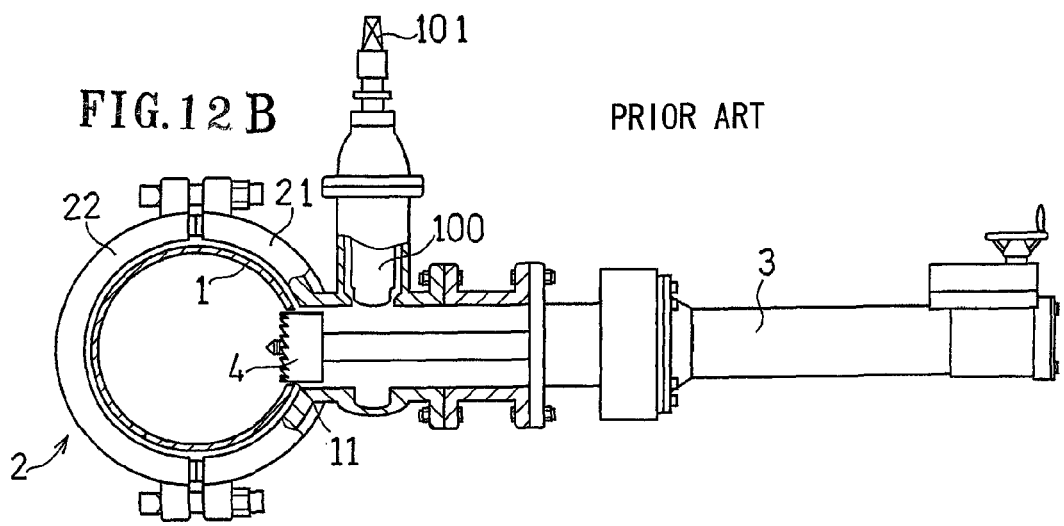
Figure 12C:
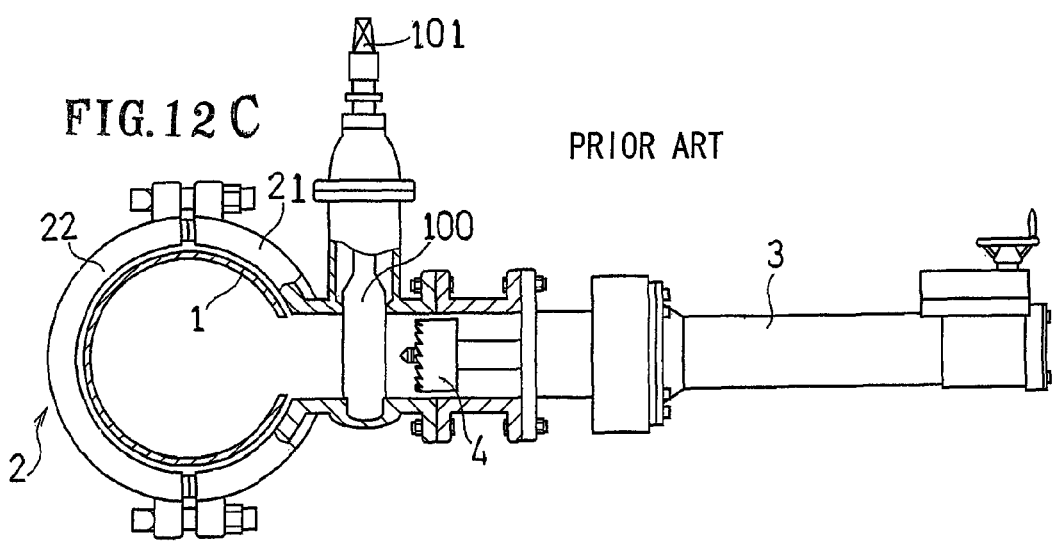

In Embodiment 2, a branch pipe portion 27A is formed in a hemispherical shape as shown in FIG. 11 for the connection of a branch pipe whose tip portion is formed in a hemispherical shape (so called an earthquake-proof joint).

Embodiment 3

Figure 13A:
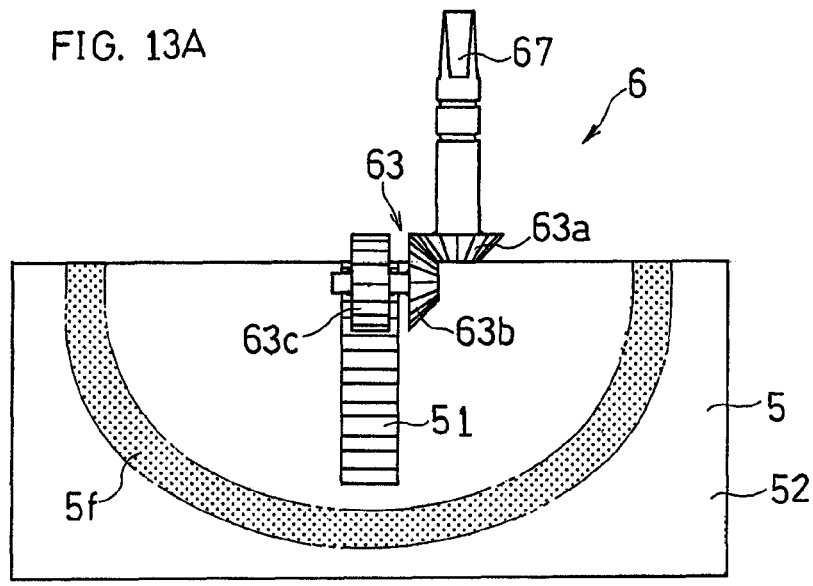
FIGS. 13A, 13B and 13C are front views showing driving gear units of Embodiments 3, 4 and 5, respectively.

In Embodiment 3, as shown in FIG. 13A, the driving gear unit 63 is formed by a pair of bevel gears 63a and 63b and a spur wheel 63c.

Embodiment 4

Figure 13B:
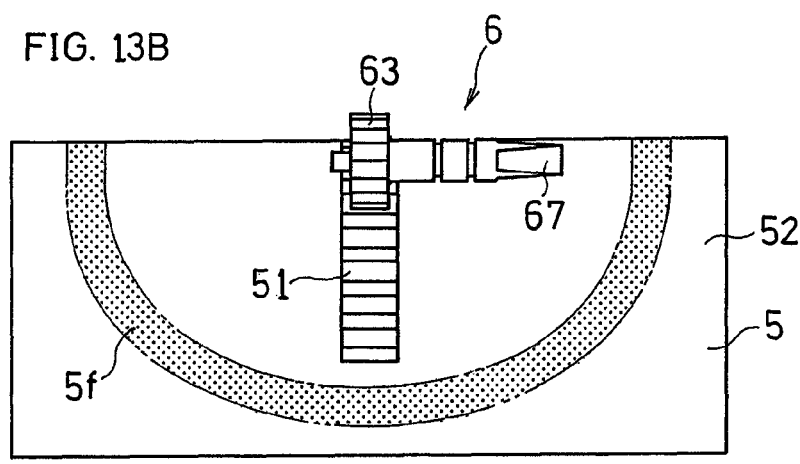

In Embodiment 4, as shown in FIG. 13B, the driving gear unit 63 is formed by a single spur wheel.

Incidentally, the driven gear may be provided in an outside region that is not surrounded by the loop-shaped contact portion. In such a case, the driven gear may be provided at one end of the valve body in the pipe axis direction.

In such a case, however, the rotational force of the valve body from the driven gear is applied to one end portion of the valve body. Therefore, the valve body may not rotate smoothly.

Embodiment 5

Figure 13C:
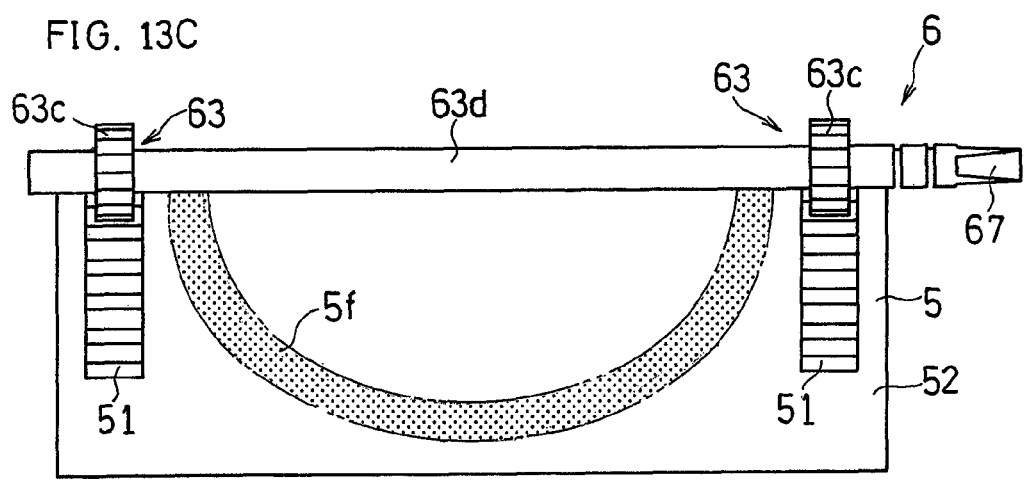

In view of this, in Embodiment 5, as shown in FIG. 13C, the driven gears 51 are provided on opposite sides of the valve body 5 in the pipe axis direction. In such a case, however, a long shaft 63d is needed in the pipe axis direction in order to transfer rotation to the pair of driven gears 51 and 51.

Such a problem is solved when the driven gear 51 is formed in the region inside the contact portion 5f of the valve body 5.

Note that in the embodiments above, the valve body 5 including the driven gear 51 is formed as an integral part by stainless steel or ductile cast iron. Where the valve body 5 is formed by ductile cast iron, the valve body 5 is subjected to an appropriate coating such as powder coating.

Embodiment 6

Figure 14A:
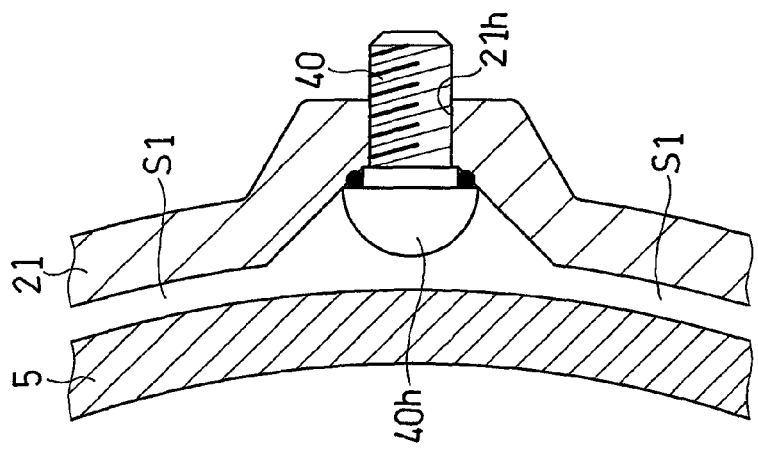
FIGS. 14A, 14B and 14C are partial cross-sectional views showing the operation of a valve-opening assisting mechanism according to Embodiment 6.

In Embodiment 6, as shown in FIG. 14A, a pusher 40 is provided which threadedly engages with a through hole 21h formed in the first separate case 21. A male screw is formed around the pusher 40, and a female screw which threadedly engages with the male screw of the pusher 40 is formed on the through hole 21h.

A hemispherical pusher head 40h is formed integral with the pusher 40 on one side of the pusher 40 that is closer to the valve body 5.

Figure 14B:
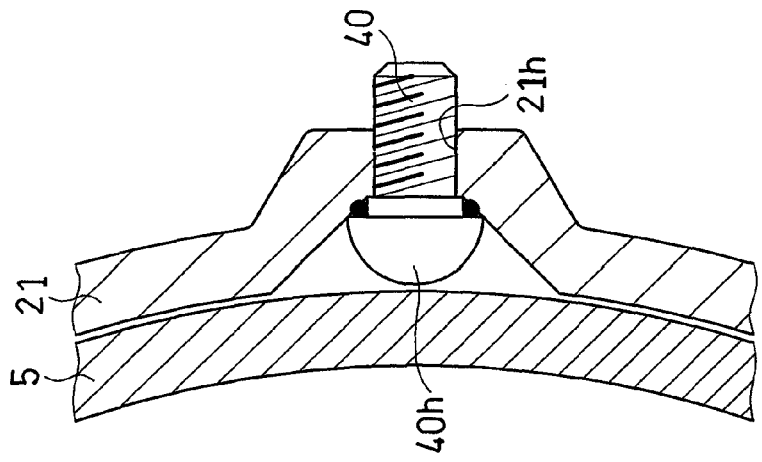

When the valve body 5 is closed and a water pressure is applied after the opening 11 is formed in the existing pipe 1, as shown in FIG. 9B, the water pressure acts only upon the concave surface of the valve body 5, and it may become difficult to open the valve body 5 of FIG. 14B.

Figure 14C:
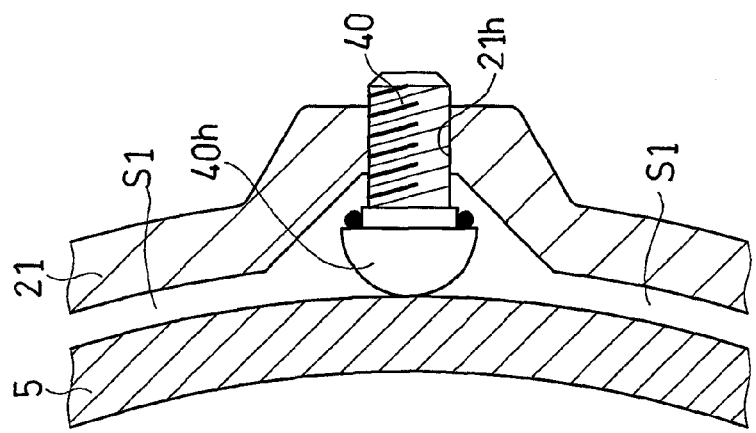

In such a case, after the valve body 5 is pushed by the pusher head 40h of the pusher 40 as shown in FIG. 14C by rotating the pusher 40 of FIG. 14B, the valve body 5 is turned in the opening direction.

Note that the pusher 40 and the through hole 21h of the first separate case 21 with which the pusher 40 threadedly engages form a valve-opening assisting mechanism.

Embodiment 7

Figure 15A:
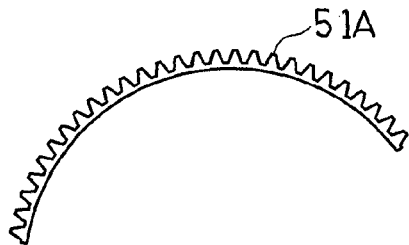
Figure 15B:
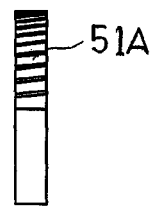

FIGS. 15A to 15G show Embodiment 7.
As shown in FIGS. 15A to 15D, the valve body 5 and a driven gear 51A are formed separately. The driven gear 51A shown in FIGS. 15A and 15B is formed by a stainless steel cast product. The driven gear 51A is arc-shaped and strip-shaped.

Figure 15C:
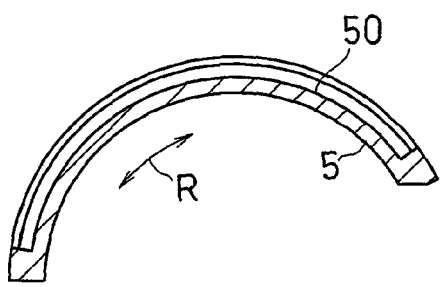
Figure 15D:
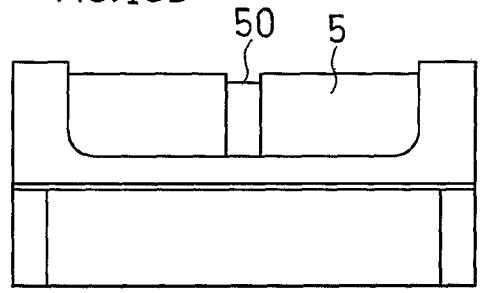
Figure 15E:
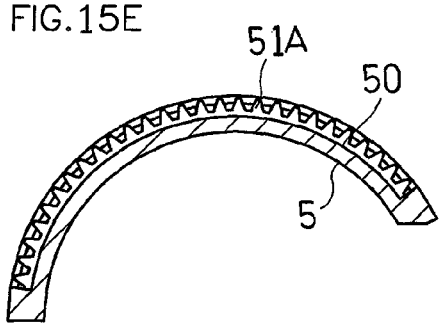
Figure 15F:
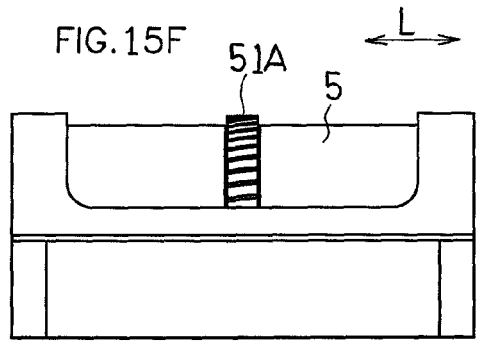

The valve body 5 shown in FIGS. 15C and 15D is made of ductile cast iron, and a groove 50 for the attachment of the driven gear 51A is formed in the valve body 5, extending in the circumferential direction R of the valve body 5. As shown in FIGS. 15E and 15F, the driven gear 51A is attached to the groove 50 of the valve body 5.

Incidentally, as shown in FIG. 4, the helical teeth 62a of the worm wheel 62 are formed inclined with respect to the pipe axis direction L of the existing pipe 1 so as to mesh with the worm 61. Therefore, as shown in FIG. 15F, each tooth of the driven gear 51A is formed inclined with respect to the pipe axis direction L. The driven gear 51A of FIG. 15F and the worm 61 of FIG. 2 illustrate the case of the right-handed thread.

Figure 15G:
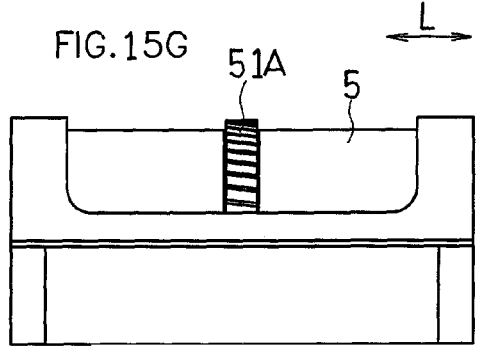

Here, if the "left-handed" specification where the valve body 5 closes when the operation portion 67 of FIG. 2 is turned counterclockwise is employed, the members are formed as follows. The thread of the worm 61 is formed left-handed, and the helical teeth 62a of the worm wheel 62 which mesh with the worm 61 are formed with an inclination with respect to the pipe axis direction L that is opposite to that shown in FIG. 4. As shown in FIG. 15G, the helical teeth of the driven gear 51A are also formed with an inclination opposite to the driven gear 51A shown in FIG. 15F.

Therefore, the left-handed and right-handed specifications can be accommodated while using the large valve body 5 as a common member.

Embodiment 8

Figure 16:
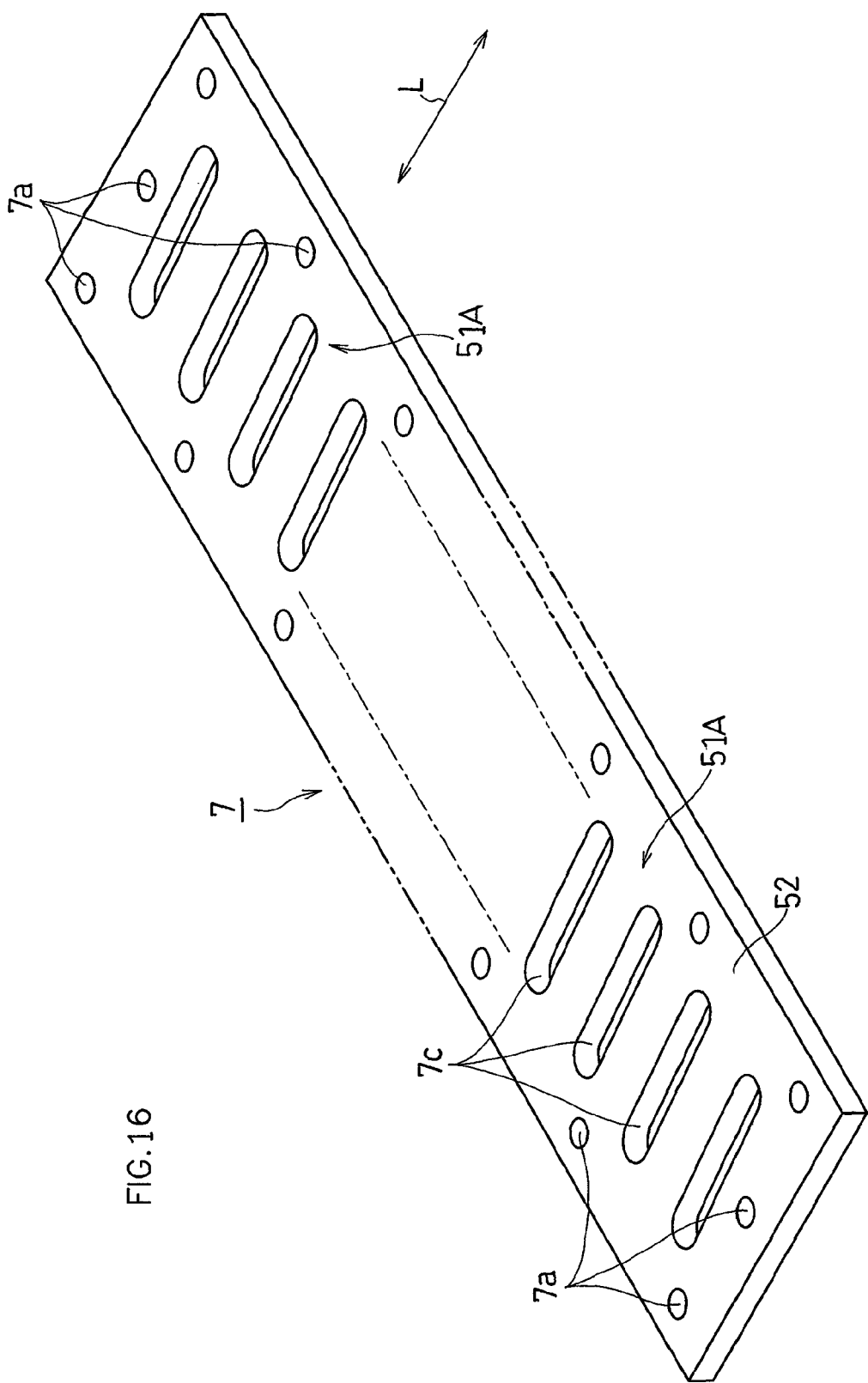
FIG. 16 is a schematic perspective view showing a plate material of Embodiment 8 flattened out.

FIGS. 16 to 19 show Embodiment 8.
As shown in FIG. 16, the driven gear 51A is obtained by forming a plurality of through holes 7c in a plate material 7 made of stainless steel. The through holes 7c are formed inclined with respect to the pipe axis direction L, and are formed in parallel to one another. As shown in FIGS. 16 and 17A, the plate material 7 is arc-shaped and strip-shaped.

Note that the plate material 7 is bent so that the upper surface in FIG. 16 is the convex surface 52.

Figure 17A:
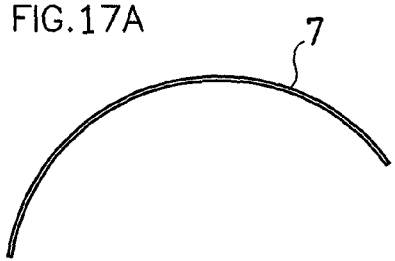
Figure 17B:
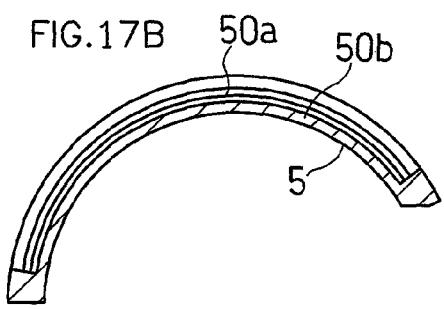
Figure 17C:
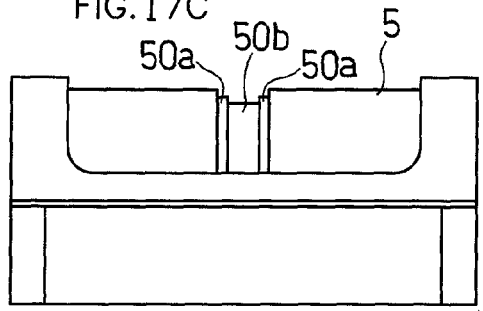

The valve body 5 shown in FIGS. 17B and 17C is made of ductile cast iron, first and second attachment grooves 50a and 50b for the attachment of the driven gear 51A are formed in the valve body 5 so as to extend in the circumferential direction R of the valve body 5.

Figure 17D:
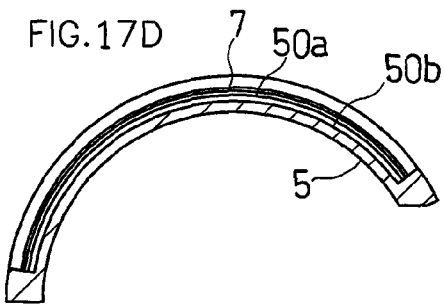

As shown in FIG. 17D, the plate material 7 is attached to the valve body 5.

As shown in FIG. 16, bolt insertion holes 7a are formed along the peripheral portion of the plate material 7. As shown in FIGS. 18A and 18B, the peripheral portion of the plate material 7 is attached to the first attachment groove 50a, and the plate material 7 is fixed to the first attachment groove 50a by bolts 7b.

Figure 17E:
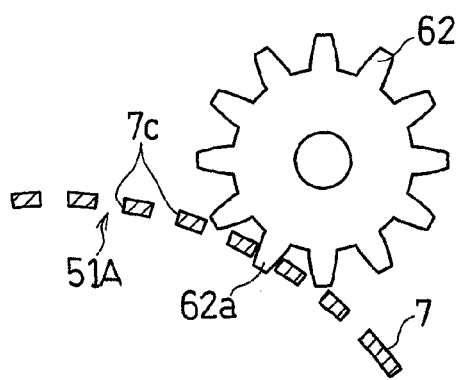

On the other hand, as shown in FIG. 18B, the second attachment groove 50b is formed deeper than the first attachment groove 50a, thereby allowing the tooth of the worm wheel 62 indicated by a two-dot chain line to enter the through hole 7c of the plate material 7 and mesh with the driven gear 51A. Therefore, as shown in FIG. 17E, the tooth 62a of the worm wheel 62 meshes with the driven gear 51A.

Figure 19:
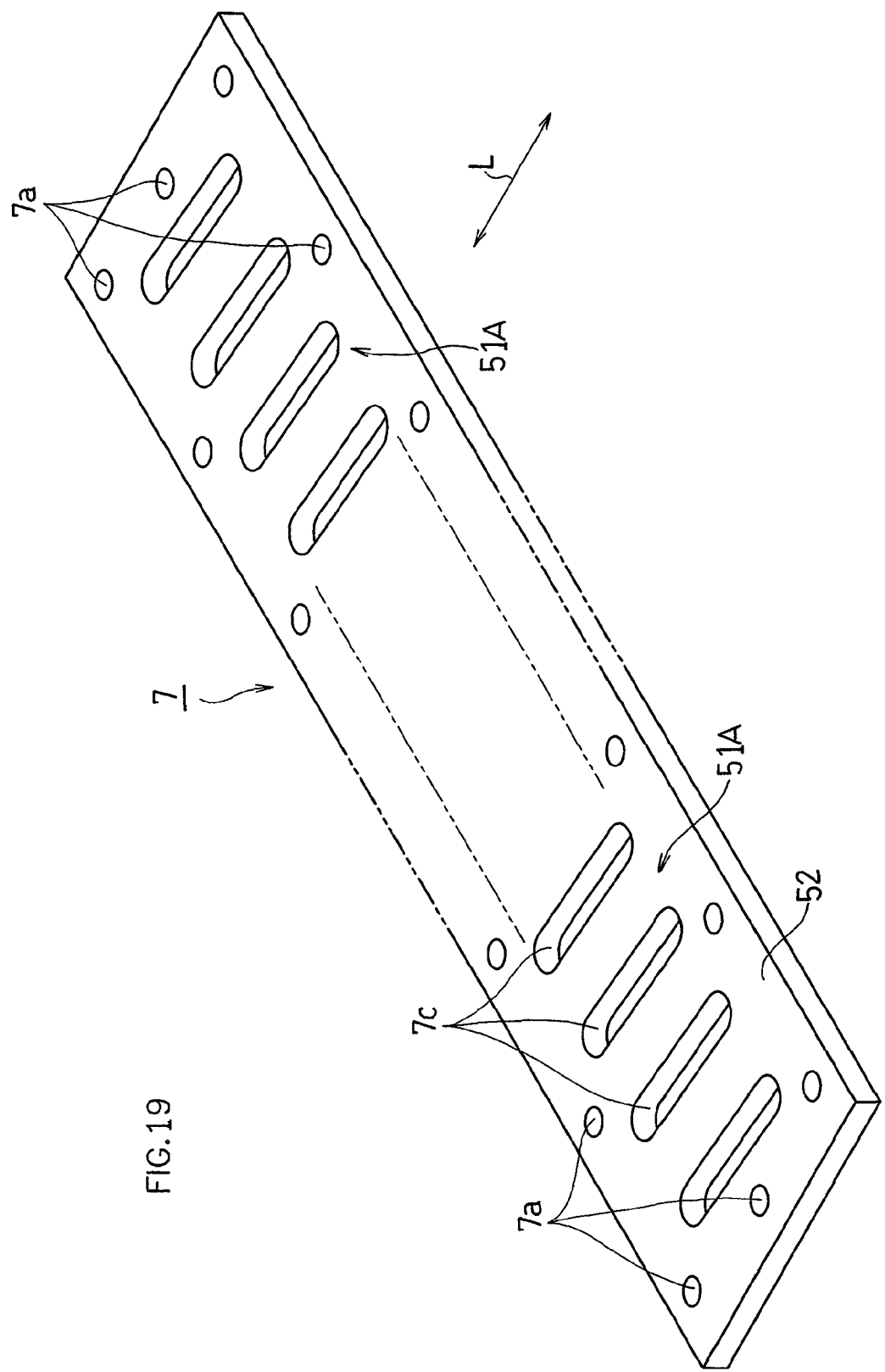
FIG. 19 is a schematic perspective view showing the flattened-out plate material as seen from the rear surface.

Here, as the plate material 7 shown in FIG. 16 is reversed as shown in FIG. 19, the inclination of the driven gear 51A with respect to the pipe axis direction L is reversed. Thus, the driven gear 51A can mesh with the teeth 62a of the worm wheel 62 which are formed left-handed.

Thus, the left-handed and right-handed specifications can both be accommodated by selectively using the front surface or the rear surface of the plate material 7.

While preferred embodiments have been described above with reference to the drawings, various obvious changes and modifications will readily occur to those skilled in the art upon reading the present specification.

While the sealing case is divided into two pieces of the first and second separate cases in the embodiments described above, the sealing case may be divided into three or more pieces.

The sealing case may be a cast product or may be formed by a steel plate. Where the sealing case is formed by a steel plate, the two separate cases may be integrated together into the sealing case by welding the first and second separate cases which are tentatively assembled together.

Moreover, it is not necessary to provide the rubber gasket on the separate cases, but the rubber gasket may be provided on the valve body.

The gear case portion may be provided on the side of the second separate case.

Thus, such changes and modifications are deemed to fall within the scope of the present invention, which is defined by the appended claims.

INDUSTRIAL APPLICABILITY

The branching unit for flow-undisrupted boring of the present invention can be used in providing a branch off of an existing pipe of water, gas, etc.

DESCRIPTION OF REFERENCE NUMERALS

1: Existing pipe
2: Branching unit
3: Boring machine
4: Hole saw
5: Valve body
6: Rotation mechanism
7: Plate material
11: Opening
12: Pipe wall
20: Sealing case
21: First separate case
22: Second separate case
28: Branch hole
30: Curved surface portion
50: Groove
50*a*: First attachment groove
50*b*: Second attachment groove
51: Driven gear
52: Convex surface
53: Concave surface
56: Rubber ring (an example of the valve seat)
61: Worm
62: Worm wheel
63: Driving gear unit
65: Bearing portion
66: Cover
66*a*: Through hole
67: Operation portion
70: Gear case portion
71: Side wall
72: Flange
73: Depressed portion
74*u*: Upper opening
75*d*: Lower opening
90: Branch pipe
R: Circumferential direction

The invention claimed is:

1. A branching unit for boring without stopping a passage of fluid suitable for boring a portion of a pipe wall of an existing pipe to form an opening in the pipe wall with a boring machine having a hole saw so as to connect a branch pipe to the existing pipe, the branching unit comprising:

a sealing case including first and second separate cases separated from each other in a circumferential direction of the existing pipe and enclosing a portion of the existing pipe, wherein a branch pipe portion branching off of the existing pipe by protruding in a radial direction of the existing pipe is formed integral with the first separate case;

a valve body including a portion having an arc-shaped lateral cross section for opening/closing a branch hole of the branch pipe portion by rotating in the circumferential direction of the existing pipe between an inner periphery surface of the sealing case and an outer periphery surface of the existing pipe;

a valve seat provided on the inner periphery surface of the first separate case with which the valve body contacts in a valve-closed state; and a rotation mechanism for rotating the valve body, the rotation mechanism comprising:

an operation portion rotated outside the sealing case;

a driving gear unit which rotates by the rotation of the operation portion; and a driven gear provided on the valve body for rotating the valve body in the circumferential direction of the existing pipe following the rotation of the driving gear unit, wherein:

a gear case portion is formed integral with an upper portion of the first or second separate case, the gear case portion having a lower opening which opens in a downward direction, allowing for a portion of the driving gear unit to mesh with the driven gear, and an upper opening which opens in an upward direction, wherein the gear case portion forms a depressed portion accommodating a portion of the driving gear unit, and allows the driving gear unit to be inserted and assembled through the upper opening;

a cover which shuts the upper opening of the gear case portion is fastened to the gear case portion;

the operation portion protrudes in the upward direction through a through hole vertically running through the cover; and the cover is removed from the gear case portion so as to allow the driving gear unit to be taken out from the gear case portion through the upper opening.

2. A branching unit for boring without stopping a passage of fluid according to claim 1, wherein:

the valve body has a concave surface curved along the outer periphery surface of the existing pipe, and a convex surface opposing the branch hole in the valve-closed state; and in the valve-closed state, a contact portion of the convex surface which is in contact with the valve seat protrudes past a surface of the driven gear in the radial direction of the existing pipe.

3. A branching unit for boring without stopping a passage of fluid according to claim 2, wherein:
the contact portion is formed in a loop shape;
the driven gear is formed on the valve body in an inner first region surrounded by the loop-shaped contact portion; and
the valve seat is formed in a loop shape, and the branch hole and the lower opening are formed in the first separate case in an inner second region surrounded by the loop-shaped valve seat.

4. A branching unit according to claim 1, wherein:
the first and second separate cases each include a curved surface portion extending along the existing pipe; and
the gear case portion further comprises a side wall rising in the upward direction from the curved surface portion, and a flange which is formed integral with an upper end of the side wall and to which the cover is fastened.

5. A branching unit according to claim 4, wherein the driving gear unit comprises a worm which rotates integral with the operation portion, and a worm wheel which rotates by the rotation of the worm.

6. A branching unit according to claim 5, wherein a bearing portion rotatably supporting the worm wheel is formed integral with the cover.

7. A branching unit according to claim 5, wherein the gear case portion further comprises a bottom wall portion rotatably supporting a lower end of the worm.

8. A branching unit for boring without stopping a passage of fluid suitable for boring a portion of a pipe wall of an existing pipe to form an opening in the pipe wall with a boring machine having a hole saw so as to connect a branch pipe to the existing pipe, the branching unit comprising:
a sealing case including first and second separate cases separated from each other in a circumferential direction of the existing pipe and enclosing a portion of the existing pipe, wherein a branch pipe portion branching off of the existing pipe by protruding in a radial direction of the existing pipe is formed integral with the first separate case;
a valve body including a portion having an arc-shaped lateral cross section for opening/closing a branch hole of the branch pipe portion by rotating in the circumferential direction of the existing pipe between an inner periphery surface of the sealing case and an outer periphery surface of the existing pipe;
a valve seat provided on the inner periphery surface of the first separate case with which the valve body contacts in a valve-closed state; and
a rotation mechanism for rotating the valve body, the rotation mechanism comprising:
an operation portion rotated outside the sealing case;
a driving gear unit which rotates by the rotation of the operation portion; and
a driven gear provided on the valve body for rotating the valve body in the circumferential direction of the existing pipe by the rotation of the driving gear unit, wherein:
the valve body is made of ductile cast iron, and a groove for attachment of the driven gear is formed in the valve body, extending in a circumferential direction of the valve body; and
the driven gear made of stainless steel is attached to the groove.

9. A branching unit according to claim 8, wherein the driven gear is formed by a stainless steel cast product.

10. A branching unit according to claim 8, wherein the driven gear includes a plurality of through holes formed in parallel to one another in a stainless steel plate material, forming the driven gear.

11. A unit for boring without stopping a passage of fluid a portion of a pipe wall of an existing pipe to form an opening in the pipe wall with a boring machine, the unit comprising:
a sealing case including first and second separate cases separated from each other in a circumferential direction of the existing pipe and enclosing a portion of the existing pipe, wherein a branch pipe portion branching off of the existing pipe by protruding in a radial direction of the existing pipe is formed integral with the first separate case;
a valve body including a portion having an arc-shaped lateral cross section for opening/closing a branch hole of the branch pipe portion by rotating in the circumferential direction of the existing pipe between an inner periphery surface of the sealing case and an outer periphery surface of the existing pipe;
a valve seat provided on the inner periphery surface of the first separate case with which the valve body contacts in a valve-closed state; and
a rotation mechanism for rotating the valve body, the rotation mechanism comprising:
an operation portion rotated outside the sealing case;
a driving gear unit which rotates by the rotation of the operation portion; and
a driven gear provided on the valve body for rotating the valve body in the circumferential direction of the existing pipe following the rotation of the driving gear unit, wherein:
a gear case portion is formed integral with the first or second separate case, the gear case portion having a first opening which opens in a first direction toward the existing pipe, allowing for a portion of the driving gear unit to mesh with the driven gear, and a second opening which opens in a direction opposite to the first direction, wherein the gear case portion forms a depressed portion accommodating a portion of the driving gear unit, and allows the driving gear unit to be inserted and assembled through the second opening;
a cover which shuts the second opening of the gear case portion is fastened to the gear case portion;
the operation portion protrudes in the second direction through a through hole running through the cover; and
the cover is removed from the gear case portion so as to allow the driving gear unit to be taken out from the gear case portion through the second opening.

12. A unit according to claim 11, wherein:
the first and second separate cases each include a curved surface portion extending along the existing pipe; and
the gear case portion further comprises a side wall extending along the second direction from the curved surface portion, and a flange which is formed integral with an end of the side wall and to which the cover is fastened.

13. A unit according to claim 12, wherein the driving gear unit comprises a worm which rotates integral with the operation portion, and a worm wheel which rotates by the rotation of the worm.

14. A unit according to claim 13, wherein a bearing portion rotatably supporting the worm wheel is formed integral with the cover.

15. A unit according to claim 13, wherein the gear case portion further comprises a wall portion rotatably supporting an end portion of the worm, and the end portion of the worm is close to the existing portion.

* * * * *